(12) United States Patent
Newman et al.

(10) Patent No.: US 12,248,579 B1
(45) Date of Patent: Mar. 11, 2025

(54) AI-BASED VEHICLE CYBERSECURITY WITH 5G/6G SUB-NETWORK TOPOLOGY

(71) Applicants: David E. Newman, Poway, CA (US);
R. Kemp Massengill, Palos Verdea, CA (US)

(72) Inventors: David E. Newman, Poway, CA (US);
R. Kemp Massengill, Palos Verdea, CA (US)

( * ) Notice: Subject to any disclaimer, the term of this patent is extended or adjusted under 35 U.S.C. 154(b) by 0 days.

(21) Appl. No.: 18/587,346

(22) Filed: Feb. 26, 2024

Related U.S. Application Data

(60) Provisional application No. 63/610,930, filed on Dec. 15, 2023, provisional application No. 63/600,989, (Continued)

(51) Int. Cl.
| | |
|---|---|
| *G06F 21/57* | (2013.01) |
| *B60R 16/023* | (2006.01) |
| *G06F 8/61* | (2018.01) |
| *G06F 8/65* | (2018.01) |
| *G06F 11/14* | (2006.01) |

(52) U.S. Cl.
CPC ........ *G06F 21/572* (2013.01); *B60R 16/0231* (2013.01); *G06F 8/61* (2013.01); *G06F 8/65* (2013.01); *G06F 11/1433* (2013.01); *G06F 2221/034* (2013.01)

(58) Field of Classification Search
CPC . G06F 21/572; G06F 8/61; G06F 8/65; G06F 11/1433; G06F 2221/034; G06F 21/575; B60R 16/0231
See application file for complete search history.

(56) References Cited

U.S. PATENT DOCUMENTS

| | | |
|---|---|---|
| 9,697,355 B1 | 7/2017 | Park |
| 10,095,634 B2 | 10/2018 | Sharma |

(Continued)

OTHER PUBLICATIONS

S. Y. P, A. Gotkhindikar and S. K. Tiwari, "Survey on CAN-Bus Packet Filtering Firewall," 2022 International Conference on Edge Computing and Applications (ICECAA), Tamilnadu, India, 2022, pp. 472-478 (Year: 2022).*

(Continued)

*Primary Examiner* — Michael R Vaughan

(57) ABSTRACT

Cybersecurity is a critical requirement for current and future vehicles, to protect against catastrophic cyber attacks. Vehicles today (including land vehicles, waterborne vehicles, and aircraft including such embodiments as airplanes, helicopters, and air taxis) are constructed with myriad separate sensors and actuators, which generally have only limited cyber protections—a worrying vulnerability. Therefore, procedures are disclosed for a vehicle-wide 5G/6G network in which each ECU (electronic control unit) is a separate user device. Each ECU is also the manager of a set of sensors and actuators, forming a local sub-network with tightly regulated wireless protocols. Each ECU and each end sensor/actuator may include an AI model to detect and defeat cyber attacks. Each sensor/actuator boots from ROM and executes from ROM, performs its specific tasks on demand, and then communicates the results solely with its ECU in a nested-star topology, thereby providing vehicle-wide cybersecurity on par with 3GPP standards.

9 Claims, 14 Drawing Sheets

Related U.S. Application Data filed on Nov. 20, 2023, provisional application No. 63/591,038, filed on Oct. 17, 2023, provisional application No. 63/588,678, filed on Oct. 6, 2023, provisional application No. 63/578,649, filed on Aug. 24, 2023.

(56) References Cited

U.S. PATENT DOCUMENTS

| | | | |
|---|---|---|---|
| 10,464,529 B1* | 11/2019 | Zhang | B60R 25/241 |
| 10,766,439 B2 | 9/2020 | Ben Noon | |
| 10,814,893 B2 | 10/2020 | Mong | |
| 10,887,349 B2 | 1/2021 | Chen | |
| 11,329,953 B2 | 5/2022 | Atad | |
| 11,470,104 B1 | 10/2022 | Chamorro | |
| 11,483,339 B1 | 10/2022 | Kaimal | |
| 11,520,881 B2 | 12/2022 | Wang | |
| 11,636,766 B2* | 4/2023 | Staahl | H04W 4/40 701/70 |
| 11,665,178 B2 | 5/2023 | Guiterrez | |
| 11,985,150 B2* | 5/2024 | Bajpai | H04L 67/34 |
| 2007/0067085 A1* | 3/2007 | Lu | B60T 8/24 340/440 |
| 2016/0330629 A1* | 11/2016 | Laifenfeld | H04W 12/12 |
| 2017/0013062 A1 | 1/2017 | Kim | |
| 2017/0257767 A1 | 9/2017 | Zhao | |
| 2017/0355381 A1* | 12/2017 | Miloser | G07C 5/008 |
| 2018/0176009 A1 | 6/2018 | Agerstam | |
| 2018/0217831 A1* | 8/2018 | Madrid | G06F 8/65 |
| 2019/0312892 A1 | 10/2019 | Chung | |
| 2019/0325135 A1 | 10/2019 | David | |
| 2019/0346860 A1* | 11/2019 | Houts | G01S 11/04 |
| 2020/0026852 A1 | 1/2020 | Sella | |
| 2020/0218531 A1* | 7/2020 | Kushwaha | G06F 8/66 |
| 2020/0228976 A1 | 7/2020 | Kawakami | |
| 2020/0344576 A1 | 10/2020 | Li | |
| 2020/0389474 A1 | 12/2020 | Levy | |
| 2021/0029807 A1 | 1/2021 | Bard | |
| 2021/0053574 A1 | 2/2021 | Bielby | |
| 2021/0101618 A1 | 4/2021 | Levy | |
| 2021/0203682 A1 | 7/2021 | Bajpai | |
| 2021/0337398 A1 | 10/2021 | Kumar | |
| 2021/0385658 A1 | 12/2021 | Munteanu | |
| 2022/0141004 A1 | 5/2022 | Murray | |
| 2022/0159444 A1 | 5/2022 | Newman | |
| 2022/0224700 A1 | 7/2022 | Appel | |
| 2022/0256348 A1* | 8/2022 | McGrotty | B60C 23/0415 |
| 2022/0294789 A1 | 9/2022 | Tikhomirov | |
| 2022/0303305 A1 | 9/2022 | Shin | |
| 2022/0321655 A1* | 10/2022 | Mendez Rodriguez | G06F 9/5044 |
| 2022/0369112 A1 | 11/2022 | Sharma | |
| 2022/0377560 A1 | 11/2022 | Zeng | |
| 2022/0394032 A1 | 12/2022 | Matsumura | |
| 2022/0394471 A1 | 12/2022 | Zhang | |
| 2022/0400118 A1 | 12/2022 | Jiang | |
| 2022/0400125 A1 | 12/2022 | Mendelowitz | |
| 2023/0022063 A1 | 1/2023 | Zheng | |
| 2023/0058016 A1 | 2/2023 | Wood | |
| 2023/0253137 A1 | 8/2023 | Huo | |
| 2023/0254294 A1 | 8/2023 | Williams | |
| 2023/0269224 A1 | 8/2023 | Whittle | |
| 2023/0276240 A1 | 8/2023 | Munteanu | |
| 2023/0379717 A1 | 11/2023 | Stahl | |

OTHER PUBLICATIONS

A. Boström and F. Wotawa, "Wireless Threats Against V2X Communication," 2023 IEEE 23rd International Conference on Software Quality, Reliability, and Security (QRS), Chiang Mai, Thailand, 2023, pp. 529-540 (Year: 2023).*

* cited by examiner

FIG. 6

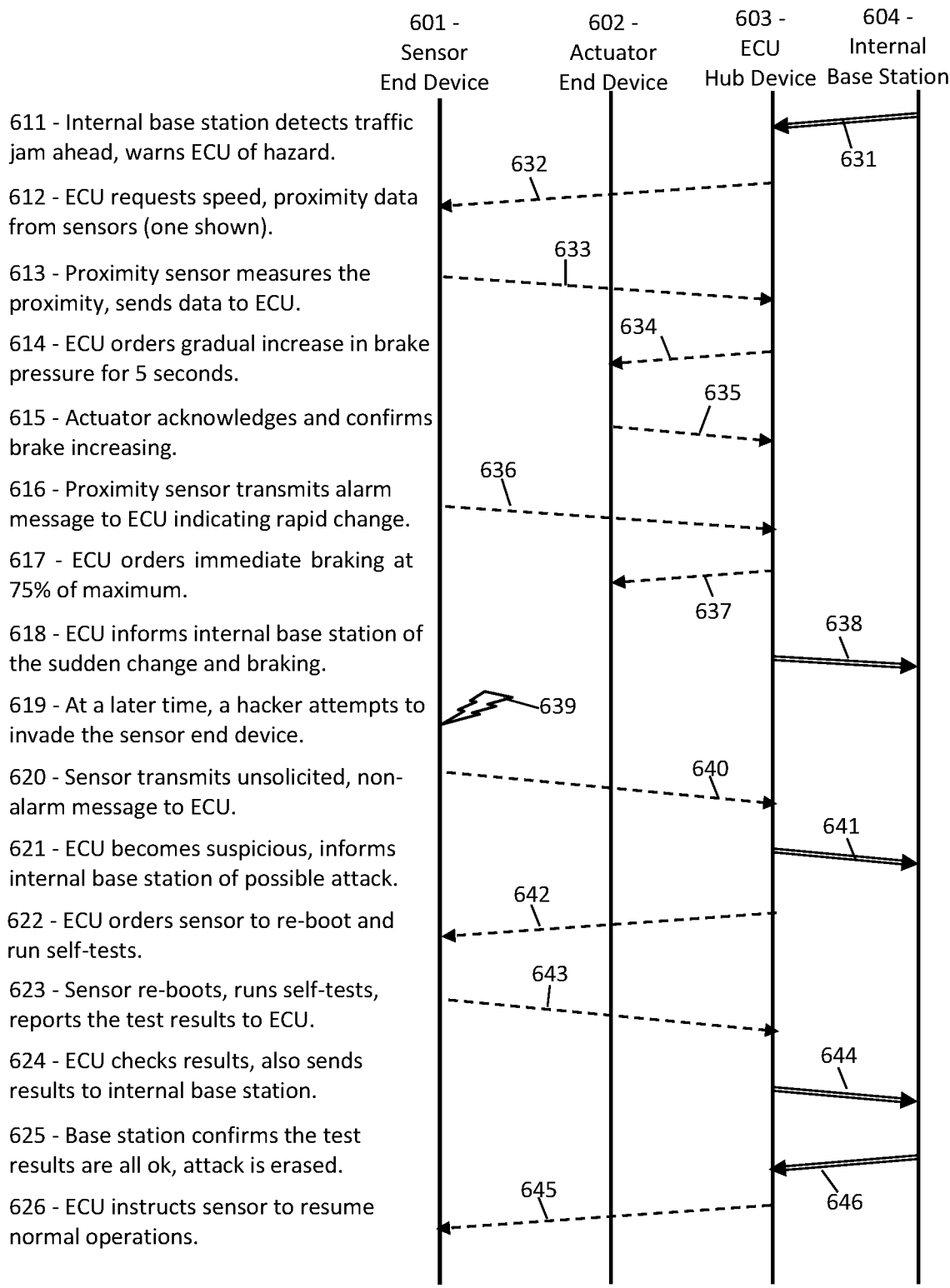

601 - Sensor End Device
602 - Actuator End Device
603 - ECU Hub Device
604 - Internal Base Station 611 - Internal base station detects traffic jam ahead, warns ECU of hazard.

612 - ECU requests speed, proximity data from sensors (one shown).

613 - Proximity sensor measures the proximity, sends data to ECU.

614 - ECU orders gradual increase in brake pressure for 5 seconds.

615 - Actuator acknowledges and confirms brake increasing.

616 - Proximity sensor transmits alarm message to ECU indicating rapid change.

617 - ECU orders immediate braking at 75% of maximum.

618 - ECU informs internal base station of the sudden change and braking.

619 - At a later time, a hacker attempts to invade the sensor end device.

620 - Sensor transmits unsolicited, non-alarm message to ECU.

621 - ECU becomes suspicious, informs internal base station of possible attack.

622 - ECU orders sensor to re-boot and run self-tests.

623 - Sensor re-boots, runs self-tests, reports the test results to ECU.

624 - ECU checks results, also sends results to internal base station.

625 - Base station confirms the test results are all ok, attack is erased.

626 - ECU instructs sensor to resume normal operations.

FIG. 7A

| 701 - THREAT TYPES | 702 - SUB-NETWORK SECURITY |
|---|---|
| Arbitrary code execution<br>Advanced persistent threat<br>Zombie (under control of attacker) | The microcontroller cannot execute code from RAM because there is no executable RAM. |
| Backdoor (unsecured access)<br>Rootkits, Bootkits | The microcontroller boots from ROM and operates code only from ROM. |
| Polymorphic (hidden in other code)<br>Drive-by download | ROM cannot be altered by wireless signals. |
| Hardware backdoor or circuit flaw<br>Hardware trojan (malware in chip) | Op-code is simple, single-task on ROM. Op-code can be tested. |
| Keyloggers (copy keystrokes) | End device does not have keys. |
| Fraudulent dialers | End device does not have phone access. |
| Privilege escalation | End device does not use privileges. |
| Shellcode (start new command shell) | End device does not use shells. |
| Cryptojacking | End device does not use crypto. |
| Email fraud (fake offers, etc.)<br>Email spoofing (fake return address)<br>Phishing (deception or impersonation) | End device does not have access to email. |
| Screen scraping (collect data from user display) | End device does not have a display. |
| Adware (on-line advertising)<br>Denial-of-service attack (message clogging)<br>Spamming (sending many unwanted messages)<br>Botnet (army of corrupted transmitters) | End device is not on the Internet. |
| Social engineering (trickery, manipulation)<br>Scareware (false alerts, threats) | End device is not in contact with people. |

FIG. 7B

| 711 - THREAT TYPES | 712 - SUB-NETWORK SECURITY |
|---|---|
| Logic bombs (triggered by a condition)<br>Time bombs (triggered by time)<br>Fork bombs (self-replicating code)<br>Zip bombs (intended to crash system)<br>Worms (self-replicating code)<br>Viruses (self-replicating intrusion malware)<br>Code-injection (hiding malware in data) | End device has no executable RAM and no hard-drive.<br>End device has no access to any other system.<br>End device has no 5G or 6G capability.<br>End device has no communication software other than the restricted link to Hub device. |
| Trojan horses (code hidden inside code)<br>Code-injection (hiding malware in data)<br>Ransomware (demanding money) | Hub device interprets all messages as measurement data.<br>Hub device alters all data before passing to base station. |
| Rogue security software | End device does not have security software. Firmware is on ROM. |
| Remote access Trojans | End device does not have remote access. |
| Cross-site scripting (inject code into website)<br>Web shells (code using website code) | End device does not have a website. |
| Fake Browser-helpers (DLL objects) | End device does not use DLLs. |

FIG. 12

1201 - In a vehicle, each end device is pre-configured with a table of N single-use keys, stored in the end device's PROM at non-execution addresses. Each end device has a different set of single-use keys.

↓

1202 - Human authorizes an update of the operating system in the end device.

↓

1203 - ECU transmits, to end device, an installation message including: instruction to do the update, an index of the single-use key in the key table, the encrypted updated firmware, information on write-enable password, and error-detection code.

↓

1204 - If there is any reception problem or error-detection disagreement, end device sends NACK, and ECU re-sends the message - but selecting a different single-use key from the table.

↓

1205 - End device receives the message and then disables the receiver, to prevent attacker from interfering while the update is in progress.

↓

1206 - End device finds the indicated single-use key in the table, checks that it is not already in the used-key list and is not zero.

↓

1207 - Using the single-use key, the end device retrieves or decrypts the write-enable password of the PROM, then activates the write function in the PROM, and erases the current single-use key in the key table.

↓

1208 - End device decrypts the new firmware using the single-use key, and stores the decrypted firmware in the RAM. End device checks hash of decrypted version.

↓

1209 - End device installs the decrypted firmware starting at first executable address, disables the write-enable function, erases all RAM, triggers a re-boot.

↓

1210 - The re-boot automatically returns the receiver to service, again erases registers and RAM, and calculates hash of the as-installed firmware.

↓

1211 - End device transmits a message to the ECU indicating the hash, and ECU checks it. If all ok, the sub-network resumes normal operation with the updated end device. If the check fails, the ECU quarantines the end device.

US 12,248,579 B1

AI-BASED VEHICLE CYBERSECURITY WITH 5G/6G SUB-NETWORK TOPOLOGY

PRIORITY CLAIMS AND RELATED APPLICATIONS

This application claims the benefit of U.S. Provisional Patent Application Ser. No. 63/610,930, entitled "Vehicle Cybersecurity with 5G/6G Sub-Network Topology", filed Dec. 15, 2023, and U.S. Provisional Patent Application Ser. No. 63/600,989, entitled "High-Security Low-Complexity Updating of 5G/6G Wireless Systems", filed Nov. 20, 2023, and U.S. Provisional Patent Application Ser. No. 63/591,038, entitled "Cybersecure Low-Complexity IoT Sub-Networks for 5G/6G", filed Oct. 17, 2023, and U.S. Provisional Patent Application Ser. No. 63/588,678, entitled "Cybersecure Low-Complexity IoT Sub-Networks for 5G/6G", filed Oct. 6, 2023, and U.S. Provisional Patent Application Ser. No. 63/578,649, entitled "Intrinsically-Secure Low-Complexity IoT Sub-Networks for 5G/6G", filed Aug. 24, 2023, all of which are hereby incorporated by reference in their entireties.

FIELD OF THE INVENTION

The disclosure pertains to vehicle security, and more particularly to methods for maintaining high cybersecurity in networked vehicles.

BACKGROUND OF THE INVENTION

Currently, vehicles include hundreds of sensors and actuators in dozens of separate electronic systems, generally lacking coherent coordination due to their separate objectives and separate development histories. Increasingly connected vehicles, with increasingly autonomous functions, are susceptible to a variety of hacking scenarios through the peripheral devices and other vulnerable points. What is needed is a planned internal communications system spanning the entire electronic environment of next-generation vehicles, designed specifically for cybersecurity.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a vehicle comprising: an internal wireless network contained in the vehicle, the internal wireless network comprising an internal base station and an internal core network; a plurality of electronic control units ("ECUs"), each ECU registered as a user device on the internal wireless network and configured to communicate wirelessly with the internal base station on managed communication channels; and for each ECU, two or more end devices associated with the ECU, each end device comprising a sensor or an actuator, the sensor or actuator operably connected to a processor comprising a programmable read-only memory ("PROM"), the processor operably connected to a wireless transceiver configured for wireless communication with the ECU; wherein the internal base station or internal core network comprises a transceiver configured to communicate, using a Doppler-corrected wireless link, with an external base station or external core network at a fixed site external to the vehicle.

In another aspect, there is a method for updating, by an end device in a vehicle, software comprising firmware in a programmable read-only memory ("PROM") of the end device, the method comprising: receiving an installation message transmitted by an electronic control unit ("ECU") associated with the end device, the end device comprising a tool operably connected to a processor operably connected to a wireless transceiver, wherein the tool comprises a sensor or an actuator, the processor is operably connected to a programmable read-only memory ("PROM"), and the wireless transceiver is configured to receive the installation message; determining, according to the installation message, an index; retrieving, according to the index, a particular single-use key contained in a single-use key table comprising two or more different single-use keys, wherein the single-use key table is contained in the PROM or another memory of the end device; decrypting, according to the particular single-use key, encrypted firmware contained in the installation message; determining, according to the installation message, a password or data indicating a password; using the password to activate a write-enable function of the PROM, and installing the decrypted firmware in the PROM; erasing or obfuscating the installation message; erasing or obfuscating the particular single-use key in the single-use key table; and executing a boot sequence contained in the firmware.

In another aspect, there is a vehicle comprising: a vehicle-wide wireless network compliant with 5G or 6G standards; a plurality of electronic control units ("ECUs"), wherein each ECU is registered as a user device on the vehicle-wide wireless network, and wherein each ECU is configured to control one or more end devices associated with the ECU; wherein each end device comprises a tool comprising a sensor or an actuator, wherein each tool is operably connected to a processor, which is operably connected to a wireless transceiver; and wherein each end device is further configured to communicate with a particular ECU that is associated with the end device, and to ignore or reject messages not from the particular ECU.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 6 is a schematic showing an exemplary embodiment of two end devices in a sub-network communicating with a manager device, according to some embodiments.

FIGS. 7A and 7B are schematics showing an exemplary embodiment of sub-network features that prevent various types of cyber attacks, according to some embodiments.

FIG. 12 is a flowchart showing an exemplary embodiment of a procedure for securely updating firmware in an end device, according to some embodiments.

Like reference numerals refer to like elements throughout.

DETAILED DESCRIPTION

Figure 1:
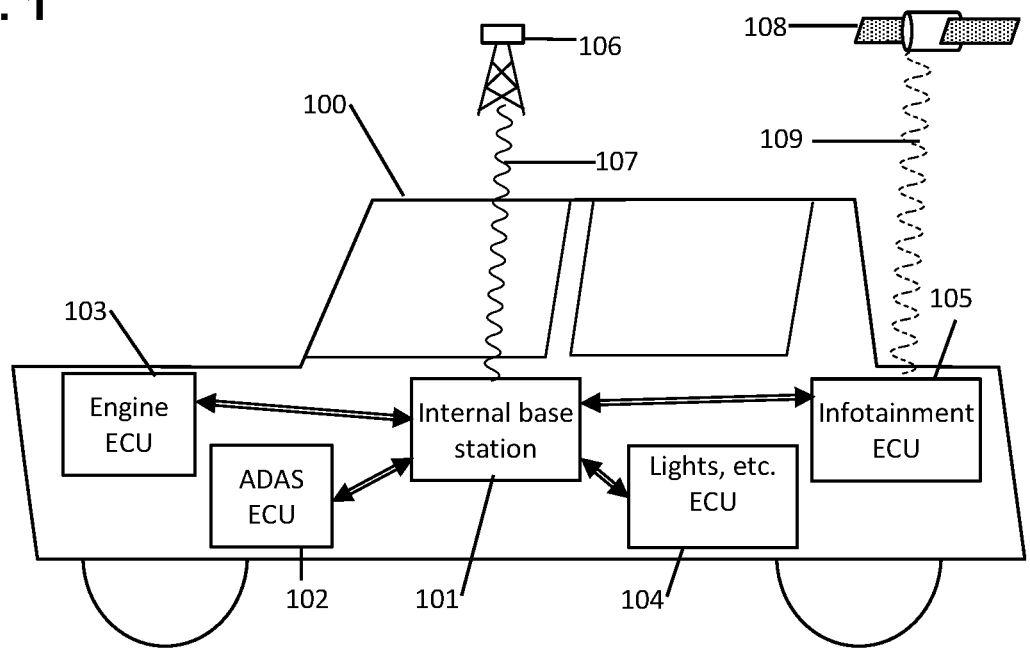
FIG. 1 is a schematic showing an exemplary embodiment of a vehicle including electronic control units, according to some embodiments.

Systems and methods disclosed herein (the "systems" and "methods", also occasionally termed "embodiments" or "arrangements" or "versions" or "examples", generally according to present principles) can provide urgently needed wireless communication protocols for connected vehicles, while maintaining the high level of cybersecurity demanded of next-generation communications. The disclosed systems and methods are suitable for vehicles having a large number of processors and a large number of sensors and actuators, wirelessly connected to various information sources. Disclosed are examples of security architectures and memory models configured to resist cyber attacks and enable remote updating without compromising security.

"Vehicles" include land-based vehicles such as cars, trucks, and trains, waterborne vehicles such as boats and submarines, and airborne vehicles such as airplanes and helicopters and air taxis. Such vehicles commonly include electronic control units ("ECUs") for controlling various functions such as the engine, the collision-avoidance system, the lights, the infotainment system, and others. Each sub-system generally includes a plurality of basic sensors and actuators configured to do a specific task. ECUs such as CAN (controller area network), LIN (local interconnect network), FlexRay, and MOST (media-oriented systems transport), may use wired connections, while others use wireless signals to access external sources such as GNSS (global navigation satellite systems), commercial radio and television channels, and networks such as 3GPP-compliant (third generation partnership project) networks, and the Internet.

Each ECU, sensor, actuator, and software routine were developed for separate purposes. Typically a modern vehicle has 1500-3000 semiconductor integrated circuits in 150 ECUs, each with 50 or more actuators and sensors, and typically 50 microcontrollers or the like. These numbers are expected to increase as myriad new services are demanded by customers. Unfortunately, the mix of electronics in modern vehicles has become a complex matrix of overlapping systems, expensive to build and cumbersome to maintain. Of even greater concern, the this provides numerous points of entry for cyber attacks. Therefore, to enable greater cybersecurity, a vehicle-wide electronic topology is disclosed herein, providing a simpler and more secure architecture, lower costs, simpler maintenance, and the ability to learn from experience. The disclosed topology may provide improved abilities to detect and deter cyber attacks. The disclosed systems and methods will therefore be the enabling factor in next-generation vehicles.

Sub-Network Topology

In some embodiments, a vehicle may contain a vehicle-wide, mobile, 3GPP-compliant, managed network, centered on an internal base station in the vehicle, which communicates with external fixed-site access points using Doppler-corrected wireless links. Each ECU of the vehicle is registered as a user device on the internal network, communicating according to 5G or 6G standards. In addition, each ECU is a member of a small "sub-network" that includes a specific group of sensors and actuators ("end devices"). Each sub-network is configured in a "star" or "hub-and-spoke" topology, with the ECU serving as both manager and gateway to the 3GPP network. For special cases, such as imagers, a master-ECU may manage a set of sub-ECUs, each with a separate sub-network but coordinating with the other sub-ECUs, through the master.

In some embodiments, the end devices communicate exclusively with their ECU hub device, using secure protocols specific to the sub-network tasks, and on different frequencies to avoid interference. The ECU transmits instructions to its end devices, and the end devices transmit measurement data or pre-configured reply messages (such as acknowledgements) back to their ECU. Thus each end device may include: (1) a single-task sensor or actuator "tool", (2) a processor such as a microcontroller, (3) a secure memory containing a boot sequence and an operating system (collectively, the "firmware") for the end device, and (4) a wired or wireless transceiver for communicating with the ECU. All sub-network messages may be "unicast", that is, addressed to a particular end device or ECU recipient. Messages from an end device to its ECU are termed "upcast" herein, and from the ECU to one of the end devices are "downcast", to differentiate from the "uplink" and "downlink" messages on the 3GPP network.

In some embodiments, the sub-networks may include both wireless and wired connections between the end devices and the ECU. For the wireless links, the sub-network may use frequencies and protocols different from the 3GPP network. Many end devices have very low communication needs, use very low transmission power, and occupy very low bandwidths with simpler communication protocols than the managed channels of 3GPP. Sub-network communications may be "time-spanning" when each modulated signal is sequential in time on a single frequency, whereas end devices that are sufficiently capable may transmit "frequency-spanning" (such as OFDM, orthogonal frequency-division multiplexing) messages that occupy multiple frequencies. Messages on restricted links may be synchronized to the 3GPP network, or in other cases may be transmitted grant-free, at-will, and asynchronously (for precise timing, for example). For the wired sub-network links, many options exist, such as single-wire analog or digital signals with chassis ground, two-wire differential signals such as 4-20 mA or CANbus, multi-wire connections including dedicated DC power levels and shielded ground, etc. It is expected that future vehicles, with increased capabilities, may convert increasingly to wireless sub-network communications, for reasons of versatility and cost.

In some embodiments, the sub-network communication links, between the ECU and its end devices, may be termed "restricted links", in that they support only the types of messages needed by the end devices to do their specialized tasks, and no more. For example, downcast messages (ECU to end device) may be configured as commands and upcast messages may be configured as data or pre-configured replies. In addition, the end devices may accept commands only in pre-configured formats and signed by the ECU, ignoring all other signals, while the ECU may accept only measurement data and pre-configured replies signed by one of its end devices, ignoring all other signals on the restricted link. Such restrictions greatly reduce the attack surface available to hackers. In addition, the sub-network may be "closed", whereby each end device, and the ECU, may reject or ignore all attempts to join the sub-network. If an end device receives an illegal communication attempt, the end device may transmit a pre-configured alarm message to the ECU. Likewise the ECU may respond to any entry request, or other illegal communication attempt on the sub-network frequencies, by transmitting an alarm message to the internal base station. Thus the end devices may serve as a first firewall, protecting their ECU from intrusion, and the ECUs may serve as a second firewall, protecting the 3GPP network from cyber attacks. For example, the end devices may detect suspicious patterns in its own operations such as weird sensor data, and may re-boot to expel the attacker before the ECU can be affected. Likewise, the ECU may detect suspicious activity in one of its end devices based on their data and replies, and then may take defensive action such as requiring the end device to perform various integrity tests.

The end devices and/or the ECU may include AI models trained to discriminate between a cyber attack, noise, interference, and equipment malfunctions, based on features of the suspicious activity and wireless signals that the end device or the ECU may have noticed. The AI model may also provide suggestions as to what actions to take, based on the fault source and other inputs, to clarify and/or mitigate the problem. For example, an ECU that receives a suspicious message—allegedly from one of the end devices, but using an excluded message type or format error or the like—may determine that either a malfunction has occurred or a hacker is active. An AI model in the ECU may facilitate such a determination, and may suggest actions that the end device can take to expel the hacker. By restricting the sub-network communications to only those pre-configured messages and formats necessary for the end devices to perform their work, and by rejecting unauthorized entry into the sub-network, and by responding defensively to any irregularity on the restricted links, the sub-network may obtain greatly enhanced cybersecurity, equivalent to the 3GPP standards, but without the complex security software and procedures required for 3GPP user devices.

ID Codes

In some embodiments, each sub-network message may include the recipient's ID followed by the sender's ID, or vice-versa, for disambiguation. Each message may also include an indicator such as a single bit, indicating whether the message is upcast message or downcast. Each message may include a "type" field or header indicating the message type, such as a command or data, thereby indicating whether the message is upcast or downcast. Each end device and ECU may be configured with a globally unique permanent "long" ID code, such as the 128-bit IPv6 identification (or a longer identification specified in a future "IPv7" standard, or some other convention). The long ID code may be fabricated into the processor, or provided in an unalterable read-only memory, or otherwise preserved in each end device and ECU. For normal usage, however, the long identification code may be cumbersome. Therefore, a "local" identification code with a smaller number of bits may be assigned to each end device, and also to the ECU. For example, the local identification codes may have just 4, 6, 8, 12, 16, or 24 bits, or other size depending on how many end devices are present.

In some embodiments, an ECU may instruct its end devices to use the longer ID codes, to avoid address conflicts with an adjacent sub-network or vehicle that happens to use the same local identification codes. An address conflict may be detected when the ECU detects a downcast message that includes the local identification code of the ECU or one of its end devices, yet the ECU did not send that downcast message. Likewise, an end device may detect an upcast message that includes that end device's local identification code, but which the end device did not send. Either event indicates a cyber attack, a mistake, a malfunction, or an address conflict with a nearby vehicle. In most cases, the ECU may assume it is due to a second vehicle, and therefore may instruct its end devices to begin using an expanded message format until the two vehicles move apart. For example, the ECU may transmit a broadcast message to its end devices, informing them of the change. To avoid any confusion with the other vehicle's end devices, broadcast messages may be signed by the ECU's long ID code.

In a first option, the expanded message format may include multiple identification codes of various sizes. For example, each end device, and the ECU, may have five levels of identification code, such as an 8-bit, 16-bit, 32-bit, 64-bit, and 128-bit ID codes. Each message may include bits indicating the format, such as the length of the ID code in use, whether the ECU identification is included, and other information. On command of the ECU, the end devices switch to successively higher or lower ID levels. When the conflict subsequently subsides due to motion of the vehicles, the ECU may instruct the end devices to switch back down to the shortest local identification codes. In addition, the ECU can command that each message will include the ID of the ECU as well as the end device, thereby identifying the sub-network in each message. Then if conflicts still persist, due perhaps to two vehicles using the same ECU local identification codes, one or both ECUs can change identification codes, or switch to the longer codes, or wait for the conflicting vehicle to leave. Alternatively, the conflicting sub-networks may temporarily switch to single-subcarrier communications, in which each sub-network is temporarily assigned to a different subcarrier frequency, until the conflicting vehicles drift apart. As a last resort, the ECU can order its end devices to begin using their unique 128-bit identification codes, and optionally the 128-bit identification code of the ECU as well. This should definitively solve the address conflict problem, but at the expense of slower communications and increased overhead due to the longer codes. Further address conflicts would then indicate a hacker intrusion.

In some embodiments, the sub-network may switch back to the shorter identification codes if the address conflict subsides for a predetermined amount of time, or when other sensors on the vehicle indicate that no other vehicles are closely adjacent. For example, the internal base station may know, based on traffic cameras for example, when a proximate vehicle has moved farther away. An AI model in the ECU, or in the base station, may determine which ID codes to use, and other communication settings, based on the type of conflict observed and its incidence rate. The AI-based parameter assignments may be selected according to the priorities of the tasks performed by each sub-network, or the costs associated with conflicted messages, or the messaging throughput requirements of each sub-network, for example. The AI output may indicate which end devices should use which ID codes as well as the ID codes of the ECU devices, and which sub-networks may communicate on which sub-carriers, which sub-networks are to use which length of identification codes, and which ones are to include the ECU code in the message, among other parameters. In addition, the AI model may enable improved detection of attack signatures. For example, a trained AI model may enable the 3GPP network, cooperating with the ECU device, to determine whether unexpected behavior is due to noise, equipment malfunction, or a malevolent attack-based on the behavior observed, its frequency of occurrence, and its distribution among end devices, in multiple sub-networks or just a single sub-network, whether the conflicts are correlated with specific actions in the vehicle, among other input parameters. The AI model may provide, as additional output, suggestions as to which integrity tests the end or ECU devices should perform to clarify the problem. The results of those tests may then be provided as further input to the AI model, for further mitigation steps. Since vehicles include many sub-networks interacting in complex ways, the demands of dynamically allocating resources and limitations responsive to changing real-time conditions, are beyond human capacity, but are well-suited to AI optimization.

MESSAGE EXAMPLES

In some embodiments, an end device can wait for an explicit command from the ECU before performing each task. For example, the ECU can transmit a predetermined downcast instruction message to the end device instructing it to do the task, and the end device may responsively execute ROM firmware associated with the instruction. In other embodiments, however, an end device may initiate the measurement or action autonomously, without an explicit ECU command. For example, the end device may determine that a certain predetermined condition is met and then do the task, such as making a measurement at a pre-scheduled measurement time, or periodically, until instructed to stop. The end device can also communicate the results to the ECU each time the task is performed, or withhold the results unless certain conditions are met. For example, the end device may inform the ECU if the measurement result exceeds a threshold, and remain silent otherwise. The end device may inform the ECU that an attempted actuation failed, or other alarm condition, and otherwise remain silent. Alternatively, the end devices may transmit an acknowledgement after receiving each downcast instruction, or after performing the instructed action. In case of an unexpected problem, the end device can transmit an unsolicited upcast message to the ECU, configured as an alarm message with the ID codes of the end device and the ECU.

In some embodiments, the end device may include pre-configured responses as well as numerical values. For example, a downcast instruction of "change the DRX period to 10 seconds" may elicit the upcast response "done", or "DRX period is now 10 seconds". On occasion, it may be necessary for the ECU to provide some kind of data to the end device. In that case, the downcast message may still be configured as a command, such as "change threshold to 12.3 degrees". (These example messages are shown as readable text for clarity. In a practical sub-network, the messages may be encoded in a terse resource-efficient code, as discussed below.)

Cybersecurity of Sub-Networks

In some embodiments, an end device may be configured to detect a cyber attack based on a received message. For example, the end device may receive a command addressed to that end device, but with unusual or illegal form, or oddly formatted, or at an unexpected time, or conflicting with a previous command, or other predetermined basis for suspicion. Optionally, the end device may include a small AI model to assist in such analysis, and to guide the subsequent mitigation. The end device may then transmit an alarm message to the ECU. Alternatively, the end device may begin a series of self-checks to determine whether the problem is due to a cyber attack or receiver noise or interference or some kind of equipment malfunction, and then inform the ECU of the self-check results. The end device may also re-boot to expel the presumed attacker, and then automatically inform the ECU that it has re-booted.

In some embodiments, the secure memory of an end device (or the ECU) may be a ROM read-only memory. For example, the ROM may be a UROM (unalterable read-only memory) which cannot be altered under any circumstances, or a PROM (programmable read-only memory) which can be altered under certain circumstances. Some PROM devices can be rewritten electronically by activating a write-enable feature, while other devices require a physical enablement, such as an ultraviolet light, to erase and rewrite. Some PROM devices can be altered at individual memory addresses, while other types must be fully erased and reprogrammed. The PROM may be a Flash or EPROM or EEPROM memory (Erasable or Electrically Erasable Programmable Read-Only Memory), each of which may be altered using electrical signals by activating an electronic write-enable function. The write-enable function may be enabled only under certain circumstances, such as upon decrypting a password, or upon providing a physical enablement such as a button press. A "SD-ROM" (self-destruct read-only memory) erases each entry after a single read, and thus may be used to store values that are to be used only once. For example, the SD-ROM may automatically erase each entry as soon as it is read, and subsequently return only zero if read a second time. Such a self-destruct ROM prevents an intruder from transmitting a bogus installation message using one of the encryption keys, because that key will be zero when the end device subsequently attempts to retrieve it. The term "secure memory" or "ROM" without further specification, includes all the types listed in this paragraph.

In contrast, a RAM (random-access memory) is a volatile, transitory, readily altered memory, and therefore may not be secure. Registers and the like in the processor, or elsewhere, are also not secure because they could be altered by a hacker, in principle. Therefore, the end device may erase all erasable addresses upon each re-boot. Alternatively, the end device may leave a few registers or RAM locations unerased, to preserve persistent data values such as the operating conditions, for convenience.

In some embodiments, the end device may be configured to boot only from its ROM and execute instructions only from ROM. Booting from ROM ensures that any malware injected into RAM by an attacker will be eliminated upon each re-boot when the RAM and registers are erased, before passing control to the operating system. Booting from ROM may thereby restore the device to a pre-configured state, thereby expelling the attacker. The end device may also execute operating system instructions only in the ROM memory, and never from a RAM, if present. The processor may be configured to prevent executing instructions from any location or address outside the ROM memory, and thereby prevent an attack in which the attacker loads malware into RAM. In addition, the ROM of an end device can include an operating system which includes routines for acquiring data, communicating with the ECU, performing security tests, and other operations that the end device needs to perform, but no routines that the end device does not need. Each unnecessary capability is an attack surface.

In some embodiments, the sub-network may be fully pre-configured and engineered for particular tasks. For example, the globally-unique identification code of each end device in the sub-network may be permanently installed and unalterable. The local identification code of the end device, the long and short codes of the ECU, the boot sequence and operating system, and other necessary firmware may be installed in the ROM and tested during fabrication. In a second version, the ROM memory chip may be manufactured separately and then installed in the new end device before the end device is mounted in the sub-network. In a third version, the end device may be fully assembled but the PROM may remain blank until just before or just after installation of the end device into a vehicle, at which time the firmware may be installed in the PROM. In each case, the ECU, or an autonomous testing device, may run the new end device through a wide variety of security tests, revealing any irregularities or defects before release.

In some embodiments, the end device may be configured to re-boot from ROM frequently, even when there is no indication of an attack. The re-boot may be on a predetermined schedule, or responsive to an event such as after transmitting each upcast message, or periodically, such as once per second or per minute or per hour or other periodicity specified in the end device's ROM or specified by the ECU, or after performing each task, or at other times according to the application, or randomly. The end device may thereby expose or expel a hacker before much harm can be done.

In some embodiments, all messages between the end devices and the ECU may be encrypted, with a different encryption key for each end device, and different encryption keys for upcast and downcast messages. In many cases, however, most sub-network messages may be transmitted plain, not encrypted. Encryption is expensive in time and energy, both of which are in limited supply for many end devices. In some embodiments, only the longer messages, such as installation messages, may be encrypted, whereas there may be no reason to encrypt shorter or pre-configured messages such as acknowledgements that have no private content. The ECU, or the internal base station, may use an algorithm or an AI model to determine which messages are to be encrypted, which are to be sent plain, what encryption to use, and when.

In some embodiments, a message may include the end device ID in plain text, early in the message, and the rest of the message may be encrypted. An end device can then readily determine whether the message is intended for it according to the recipient ID, and can ignore the rest of the message if not. Likewise an upcast message with the same format enables the ECU to determine which of its end devices is transmitting the message. The encrypted message may include an encryption indicator indicating whether it is encrypted, such as a particular bit pattern placed at the start of the message, or spaced apart from the start of the message by a gap of no transmission, or in a predetermined location within the message such as immediately after the end device's identification code (or the ECU's identification code if present), indicating that the subsequent portion is encrypted. A gap of no transmission may be placed before or after the encryption indicator, or between the plain and encrypted portions. The encryption indicator may be multiplexed with the upcast/downcast indicator and/or an indication of the length of the ID code in use. The encryption indicator may also serve as a demodulation reference and a phase-tracking reference. For example, the particular bit pattern may exhibit certain modulation levels that the recipient can use to recalibrate its modulation levels for better reception of the subsequent message, such as a short-form demodulation reference showing the maximum and minimum phase (or amplitude) modulation levels, from which the receiver can calculate the intervening modulation levels. The particular levels may indicate whether the rest of the message is encrypted.

In some embodiments, the end device may be configured to detect a cyber attack. For example, the end device may detect an unexpected change in its RAM memory or registers or actuator position, or other alteration which the end device did not do. This is strong evidence of intrusion. Alternatively, the end device may perform a measurement and find an unexpected value, such as a value out of range or inconsistent with other data, which may be due to noise or sensor failure, or may be evidence of an attacker. The end device may become suspicious upon receiving an instruction allegedly from the ECU, but malformed or inconsistent or at an unexpected time or in an inappropriate situation. In another example, the end device may respond to a regular ECU command and reply as usual, only to be asked by the ECU why the end device sent an unsolicited reply message (which indicates that the ECU did not send that command). In each case, or for other possible attack signatures, the end device may take defensive action. The defensive action may include transmitting an alarm message to the ECU, or automatically initiating a series of self-tests in the end device's operating system. Alternatively, the ECU may instruct the end device to execute those self-tests, responsive to the alarm or unsolicited reply message. An AI model, in the ECU and/or the end device, may analyze the observations and determine whether a cyber attack, or a sensor malfunction, or receiver noise is most likely the cause, and suggest the best mitigations.

In some embodiments, the end devices may include routines in the ROM firmware for various self-tests. To detect any alteration of the boot sequence or the operating system, the end device can calculate a hash or CRC or parity construct of the ROM contents, or subsets thereof. The hash (or etc.) may be configured with 16 or 32 bits for convenience, or with 128 bits to match the security of the ID codes, or other length as required for security. To analyze the problem in more detail, the end device may encrypt and transmit the entire contents of the ROM, instead of a hash. The ECU may then quarantine the end device since any change in the ROM indicates a serious failure. The end device can also encrypt and transmit the contents of the RAM to the ECU, to determine whether hackers have injected malware. In addition, to determine whether the RAM is still under control of the processor, the end device may attempt to erase all of the RAM, and then calculate a hash or parity construct of the RAM memory after erasure, which should be zero. To check the processor registers, the end device may set the registers into a known configuration, and then calculate a hash of the registers, and report to the ECU. Any disagreement indicates either an attack or a hardware failure. To detect hacker interference in the operation of its sensor or actuator, the end device may trigger a series of measurements or actuator actions in rapid succession, followed by a report of the results. Any inability to perform such a stress-test (which the end device has previously performed successfully) would indicate an intrusion or some kind of equipment deterioration. The ECU may know the correct answer for each of these tests, but the end device does not, in this example. Hence the ECU (or its AI model, or an AI model in the base station/core network) can use the results to localize the problem, or at least to determine whether the problem is still present after re-booting.

To detect an alteration in the firmware routines, the ECU may instruct the end device to perform a specific self-test and then report the results. The ECU measures how much time elapses for the end device to complete and report the results, and compares with a previously measured time interval for the same test. For best precision, the end device may transmit the report asynchronously as soon as the results are known. The ECU may require the other end devices in the sub-network to remain silent until the self-test has been reported and acknowledged, to avoid cross-traffic delays.

If the results of the self-tests are all in agreement with expectations, the ECU may allow the end device to resume normal operations; however, the ECU may treat messages from that end device with special care thereafter. If the test results indicate a likely cyber attack, the ECU may instruct the end device to re-boot, and then perform the self-tests again. If the second self-tests also indicate an intrusion, the ECU may quarantine the end device by cutting off all further communication with it, and may submit a maintenance request. In addition, the ECU may perform its own self-tests to check whether the attack has propagated upward into the ECU, and if so, the ECU may alert the internal base station (using a pre-configured alarm, to avoid any possibility of propagating the infection), and may then quarantine itself by cutting off all further uplink communication until notified that the issue has been repaired.

In some embodiments, upon a suspected cyber attack, the end device and/or the ECU may be configured to avoid re-booting, so as to preserve the evidence of intrusion, from which the identity and/or method of the attacker may be determined. If the self-tests indicate something other than a cyber attack, such as a flaky sensor or communication faults or excessive noise, then preserving the evidence may lead to an effective solution. For example, if the problem is determined (by an AI analysis) to be merely a noisy sensor, the ECU may begin averaging multiple measurements to obtain a more accurate value. If the self-tests indicate that the problem is caused by weak signal reception or message interference, the ECU may increase its downcast power to improve reception by the end device, and/or instruct the end device to increase its upcast power.

In some embodiments, an end device may become unable to respond to instructions from the ECU due to a software bug, or a cyber attack, or a receiver problem, among others. Even worse, the end device may be unable to recognize, or respond to, a command to re-boot. The ECU (or the internal base station) may then force a re-boot by temporarily cutting off the power to the end device, which then re-boots upon power-up.

Securely Updating

In some embodiments, one or more end devices may need to update its firmware, to fix a bug or enable new tasks for example. Disclosed below are three versions of ways to securely update the firmware of an end device.

In a first updating version, an end device may be updated by physically detaching the end device from the sub-network in a repair station, changing the firmware electronically, re-installing the end device, and informing the ECU via the 3GPP network.

In a second updating version, the firmware of an end device may be updated using a physical enablement that hackers cannot copy. The physical enablement enables the PROM to be altered, but cannot be done remotely. Updating by physical enablement may be suitable when the end device is accessible to a repairman but not accessible to a hacker. For example, a physical enablement may be a button press on the end device, configured to energize the write-enable input of the PROM. The physical enablement may be a JTAG (joint test action group) connector which can reprogram the PROM when connected to a suitable programmer device. The physical enablement may be illumination of the PROM by an ultraviolet light, which may be applied manually to the device. In some embodiments, the physical enablement may be the placement of a NFC (near-field communication) device against the end device, in which case the updated code may be transferred through the NFC device wirelessly. The physical enablement may be a SIM (subscriber identification module) card that can be changed for updating. For example, a new operating system may be included in the memory of the SIM card, and the end device may copy the new firmware into its PROM. Alternatively, the end device may treat the SIM memory as its ROM, and may execute the boot sequence and operating system directly from the SIM memory thereafter, with no other installation steps required. In that case, replacing the SIM card is equivalent to replacing the firmware. As a further option, the SIM card may include installation instructions or a password or other enabling information, which enables the end device to install a wirelessly delivered copy of the new firmware, which would be rejected absent the SIM card enablement. In each case, the physical enablement allows the firmware to be updated, but cannot be performed remotely.

In a third updating version, the end device firmware may be updated using wireless communications alone, without a physical enablement, yet may maintain a high level of cybersecurity on par with the 3GPP network. For example, the end device may have a table of "single-use keys" installed in protected ROM, reserved for system updating. A single-use key is a decryption key that is used only once, and then discarded. The ECU may encrypt the new firmware using one of the single-use keys, then transmit the encrypted firmware to the end device in a downcast message, along with an index or address indicating which of the single-use keys was used. The end device does not have direct access to the single-use key table, except when so instructed by the installation message, and then can retrieve only the one key indicated by the index. The end device can then decrypt the firmware using the key, and install the firmware in the PROM.

In some embodiments, the single-use key table may be in a portion of the end device's ROM, such as the first or last portion of the ROM that includes the operating system and/or the boot sequence. The portion containing the single-use keys may be protected from being executed inadvertently, and may also be protected from snooping by a hacker. For example, each address of the PROM may include an extra bit or other indicator indicating which addresses are protected. The extra bit causes the processor to read the contents as NOP or zero when read, absent the installation message instructions. The processor can then retrieve the single-use key from the protected table only only when authorized by the installation message. In addition, the indicators may indicate that the ROM addresses (other than the key table) are to be read as execution instructions only, never as data, whereas the key table addresses are to be read as data only when instructed by an installation message. (Single-use keys that resemble executable instructions may be discarded, to prevent inadvertent execution of the key table.)

In other embodiments, the single-use key table may be protected in a separate memory, separate from the operating system. The key table memory may be an unalterable UROM which cannot be changed. In addition, each address of the UROM, or at least those addresses occupied by the single-use key table, may include the non-execution indicator, as described above, to prevent inadvertent execution and snooping.

In some embodiments, the single-use keys may be sufficiently long to defeat a brute-force attack. For example, the single-use keys may be 128 bits in length for sufficient security with current technology, or a longer bit length if needed to defend against future quantum computers and the like. The key may be applied cyclically to decrypt the message in segments, effectively a "non-public secret key" that is discarded after use. Alternatively, the single-use key may be equal in length to the entire encrypted firmware, effectively a "one-time pad" of random values. However, such a huge key could be cumbersome. The single-use keys are expected to provide ample security for wireless updating of firmware in low-cost end devices, while requiring only basic operations that the low-cost end device microcontrollers provide natively. "Absolute" security is expensive and time-consuming; "sufficient" security is cheap and quick.

To consider a specific non-limiting example, the single-use keys could be 128-bit codes, and the table may contain 256 such codes (thereby enabling N=256 wireless updates). The required memory size is then N*KeySize/WordSize. For KeySize=128, N=256, and an 8-bit WordSize in memory, the table fits in a standard 4 k byte ROM, which are readily available at low cost. In the future, key codes with 256, 512, 1024, or larger bit counts may be necessary to prevent brute-force attacks using quantum computers or other high-performance computing technologies. In some embodiments, the firmware can still be updated even after the N keys have been used. To do so, a physical enablement may be applied, enabling the new firmware and/or key table to be copied into the system PROM. Alternatively, the key table may be in a secondary PROM separate from the system PROM. In either case, the physical enablement may allow the entire key table to be refreshed, thereby providing an additional N updates.

In some embodiments, a new single-use key table may be included in each installation message, encrypted along with the new firmware. The new key table may be the same as the old key table but with all of the previously-used keys erased. Or, more preferably, the new key table may provide all new and different keys upon each installation. Unlimited updates are thereby supported.

In some embodiments, upon receiving an update installation message, the end device may immediately disable its receiver (or ignore incoming signals) thereby preventing attackers from interfering with the updating procedure. The ECU may order the other end devices in the sub-network to remain silent until the updating is completed, thereby enabling the ECU to listen for an attacker's attempted intrusion signal. In addition, the ECU may detect a bogus installation message sent by an attacker, and may respond by immediately transmitting random signals on the same frequency, thereby causing numerous message faults, and causing the end device to reject the message.

In some embodiments, the end device system memory may be a PROM that is alterable only upon activating a password-protected write-enable function. If the PROM is the type that requires a UV light for erasure, the password may control access to a built-in ultraviolet LED. The password may be equal in length to the single-use keys, or other length for sufficient security. The password may be provided in the installation message, encrypted along with the firmware. Alternatively, the password may be hidden in the old or new firmware, at a location and format specified in the installation message. For even greater security, the write-enable password may be split into two halves, in which the first half of the password is hidden in the new or old firmware, and the second half is provided, encrypted, in the installation message. For even greater security, the password may be encrypted by a second single-use key located adjacent to the index of the installation message. In each case, retrieving the password is trivial for the end device, but essentially impossible for the attacker.

In some embodiments, the installation instructions of the end device may include receiving and checking the installation message, turning off the receiver, retrieving the single-use key according to the index in the message, decrypting the new firmware, enabling the write-enable feature according to the password, copying the new firmware into the system PROM, erasing all temporary memory such as the RAM and registers, disabling the write-enable feature, restarting the receiver, running the boot sequence, and starting the new operating system. The boot sequence may also include erasing the RAM again, thereby ensuring that the end device is restored to a known state after each re-boot. In addition, the end device may transmit a "completion" message to the ECU after each re-boot, informing the ECU that the re-boot has been completed, at which time the ECU may call for additional self-testing, and/or inform the end device of the current sub-network parameters and conventions (the "running conditions", such as which local identification code to use), since that data may have been erased during the re-boot. Alternatively, the end device may include a "retained memory" that is not erased during the boot sequence. The retained memory may contain the current running conditions such as ID codes, frequencies, and the like. Hence the end device can readily determine the running conditions after a re-boot, for convenience. However, the retained memory can be erased for security during a system update, or upon command of the ECU, and restored thereafter by the ECU.

In some embodiments, the end device may include a list indicating which single-use keys have been used, that is, a "used-key list". Whenever the end device receives an installation message, the end device can determine whether the key indicated in the installation message is already in the used-key list, and if so, may transmit an alarm to the ECU. The used-key list may also include the index of each used key, so the end device can check the index also. The used-key table may prevent an attacker from using an earlier key to force a malware installation. The used-key table may be encrypted as well, thereby preventing hackers from using a previous installation message and its single-use key to determine the password, memory configuration, formats, and so forth. (The used-key list may be unnecessary if each single-use key is erased from the single-use key table upon first usage.)

In some embodiments, an end device may prevent a hacker from invading the end device. The attacker might be able to eavesdrop on the installation message, but cannot then repeat the installation with malware, because each key is used only once and then erased or placed (encrypted) on the used-key list. In addition, the hacker does not know the password for unlocking the PROM write-enable feature. If the attacker tries to invade the installation message, by injecting malware in place of the new firmware during the installation message, the attack would fail because such interference would cause reception faults, thereby causing the end device to reject the message. Each one of these steps is readily performed by the most primitive microcontrollers, but would be very challenging—if not impossible—for a hacker to emulate. By these means, the wireless updating procedures disclosed herein may provide very high cybersecurity for updating of end device firmware (and other processors such as the ECU), thereby providing security on par with that maintained in the 3GPP network, but without the complex and computationally demanding prior-art security protocols.

In some embodiments, for even greater security, the ECU may also be configured to prevent an attacker from infecting the 3GPP network. In a "code-injection" attack, for example, the attacker conceals executable code in data, such as the measurement data of an end device, which is sent to the ECU. However, the ECU may be configured to interpret every upcast message as raw numerical data or a predetermined answer, and never as executable instructions or computer code. In addition, the ECU may process the data it receives before passing it on, such as averaging multiple measurements or calculating differences between successive measurements, or other analysis on the data that destroys any instructions hidden in the data. In addition, the ECU may be configured to pass only a summary report uplink, never raw data from the end devices, further protecting the 3GPP network. Thus the ECU protects itself and the larger network from intrusion. In addition, the ECU may watch for any indication of hacking, such as an improperly stated answer or an unrequested sensor message or an unreasonable data value or other abnormal event. An AI model in the ECU may analyze those inputs and determine the likely cause, including hacking. On any suspicious event that may indicate an attack attempt, the ECU may initiate further defensive action.

In some embodiments, for even greater security, the ECU may be configured to obfuscate any injected malware upon receipt. For example, the end device may be configured to transmit its measurement data in a format that includes a couple of additional bits of random noise, embedded in each message element according to a pseudorandom algorithm. The ECU then uses the same algorithm to extract and discard the extra bits before processing the remaining bits as proper data. If a hacker tries to insert code into an upcast message, the bit extraction step would automatically clobber the code, thereby defeating the attack. By treating upcast data as data, and by processing the data before passing it on, and by deleting the secret extra in the raw data, and by filing summary reports instead of raw data, the ECU can protect itself and the 3GPP network, even in the (highly unlikely) event that one of the end devices has been invaded.

In some embodiments, the ECU may include, in the installation message, an error-detection code (such as a hash or digest or CRC or parity construct or the like) of the as-transmitted installation message, optionally exclusive of the error-detection code itself. The end device can calculate the error-detection code based on the as-received version of the installation message, and compare. If there is a mismatch, the end device may conclude that there was a transmission error or that a hacker intervened, or some other mishap, and may reject the update message. The end device may then transmit a message informing the ECU of the rejection, or transmit a NACK which the ECU would interpret as a rejection. The ECU may then try again, using a different single-use key. In addition, the ECU may prepare a second error-detection code, of the new firmware in its decrypted form, and may include that second error-detection code in the update installation message (encrypted, along with the firmware). The end device may then calculate the second error-detection code of the new firmware after decrypting, but before installation into the PROM, and compare to the value provided in the message. Any mismatch may cause the end device to abort the update and alert the ECU.

In another embodiment, the ECU may calculate the error-detection codes of the encrypted and decrypted firmware versions, but may transmit the installation message without those values. Upon receipt, the end device may calculate those values and transmit them back to the ECU. The ECU can then check them and transmit an ACK if the values are correct, enabling the end device to finish installing the new firmware. If any mismatch, the ECU can transmit NACK, causing the end device to abort the update.

In some embodiments, each end device may include two separate ROM memories configured for different purposes. For example, a first PROM may contain the single-use key table, the boot sequence, and the operating system, while a second memory may contain the update instructions for performing the installation. In this version, the end device operating system includes no updating instructions. Instead, upon receiving an installation message from the ECU, the end device processor jumps to the UROM and executes the installation instructions there. For security, the end device may be unable to access the second ROM, absent an installation message from the ECU. The installation message may indicate a starting address of the installation instructions in the second ROM. An advantage of placing the updating instructions in a separate memory may be that the system PROM can be completely erased and re-written during the installation, since the instructions are contained in the second memory. Execution from a PROM while it is being updated can be tricky, and in some cases, impossible. The separate installation instructions can also enable the end device to recover if an installation is interrupted after the operating system and the boot sequence have been erased, by continuing to execute from the second memory. In one case, the installation instructions may be contained in a secure memory installed in the end device processor itself, in which case the installation instructions may be executed from the in-processor memory instead of a second ROM. The update installation message may provide an authorization or a password or other security feature that enables the processor to begin executing from the second memory or the in-processor memory.

In some embodiments, the end device may include a SIM card reader. The SIM card may include a memory containing the new firmware. In a first version, the new firmware is read from the SIM card and installed in the PROM. The SIM card may also include the installation instructions, so that the processor can execute the installation instructions from the SIM card memory instead of attempting to execute from the same PROM that is being updated. The SIM card may then be withdrawn after the updating, or it may be left in the device but rendered inaccessible without a password or the like.

In a second version, the end device may use the SIM card memory as the main system memory. For example, the end device processor may execute the boot sequence and the operating system directly from the SIM card instead of a separate PROM. In some cases, the end device may have no PROM at all, continuing to execute exclusively from the SIM card thereafter. In some cases, the SIM card reader may have no write function, so that the SIM card memory serves equivalent to a UROM containing the firmware in an unalterable form, yet can still be updated by replacing the SIM card with another SIM card. Updating then involves physically replacing the SIM card.

In a third version, the SIM card may contain the single-use key table. After all keys have been used, a fresh set of single-use keys may be provided by replacing the SIM card. In some cases, the SIM card reader may include an erase feature, by which individual memory locations in the SIM card memory may be erased or set to zero, in which case each single-use key can be erased as soon as it is retrieved, preventing re-use.

In some embodiments, the vehicle may be an aircraft. As with land-based vehicles, the cybersecurity of aircraft remains a critical need. Hence, the systems and methods disclosed herein may be advantageously applied to aircraft as well as land-based vehicles. In addition, the systems and methods may further include an automatic collision avoidance system to prevent or minimize collisions between two aircraft, or between an aircraft and a ground vehicle, or between the aircraft and a fixed object while taxying. For example, the automatic collision avoidance system may be configured to acquire data about proximate objects using sensors such as cameras, lidar, radar, ultrasound and the like, and may include a processor configured to predict future trajectories of the aircraft and the other object, and to alert the aircraft pilot when a collision becomes possible and/or imminent. The processor may be further configured to autonomously perform an emergency evasion maneuver, in the air or on the ground, to prevent such a collision, when the pilot's response to the alerts is insufficient. The processor may further include an AI model trained to recognize possible and/or imminent collisions, and/or to calculate a series of actions (braking, steering, accelerating) to avoid or at least minimize the collision.

Air Taxis

As an exemplary application of the present principles, the cybersecurity of air taxis may be considered, since they and all other aircraft require high security.

Air taxis have gone from a distant pie-in-the-sky concept with no real assurances of success to a subset of aviation with enormous potential. This is why companies are investing billions in the development of these air taxis. Just some of the companies seriously developing air taxis include: Hyundai, Joby Aviation, Volocopter, Lilium, Archer Aviation, Airbus, Vertical Aerospace, EHang, Kittyhawk, Wisk, and Beta Technologies.

Dated Feb. 13, 2024 for the Robb Report under 'Aviation,' Dan Sloat writes an excellent summary as follows:

"They're coming, faster than you think. The first eVTOL air taxi is already operating, with a half-dozen others expected in the next two years.

"Air taxis will debut this year in places like France, Italy, South Korea, and Central America. They're already flying in China.

"Advanced Air Mobility (AAM) is a global movement to launch a new mode of transportation using what amounts in most cases to super-sized, passenger-carrying drones, known as electric vertical takeoff and landing (eVTOL) aircraft. While the name is clunky, the concept is quiet and sustainable: Move people and goods faster and safer than a car, while producing less noise and carbon emissions than a helicopter.

"The first air taxis are just getting started, but most analysts expect a half-dozen to be commercially certified by 2026, and to be part of mainstream urban transport in the next 10 years. The multi-passenger eVTOLs on this list are different than one-person electric aircraft used for recreational purposes and regional eVTOLs that will take on existing commercial airlines. As the name suggests, they are almost strictly for urban use.

"Aviation is something that roughly 80 percent of the global population has never experienced. Intracity air travel is rare, and limited to helicopter travel. But that will all change with the advent of air taxis. They will be commonplace in large urban centers like New York, London, and Paris, as well as being critical to easing the ground congestion in megacities like Sao Paulo, Mumbai, and Cairo.

"Ideally, AAM will not only achieve its goal of broadening the reach of aviation to benefit more people but also increase the frequency of those benefits. Instead of two flights per year, imagine a city where many fly twice each day as part of their commutes."

Of note is that one forward-thinking leader—Hyundai's air taxi subsidiary, 'Supernal'—plans to revolutionize urban commuting with air taxis, targeting FAA certification as early as 2024, and then commercial launch in 2028.

The Hyundai Supernal S-A2 promises seating for five, 120 mph, and 20 to 40 miles of range. Hyundai expects its air taxis to be piloted initially, but transition to autonomous operations over time.

Regulatory approval and pilot certification would certainly become mandatory, if common sense prevails. Indeed, it would be decidedly unsafe if billionaires and the like with zero flying experience flit about willy-nilly at all hours of the day and night in major urban areas, such as New York, Chicago, Los Angeles, and many dozens of other densely-populated cities around the globe.

This being said, and with the future of air taxis no longer in doubt, the cybersecurity embodiments of the present disclosure are ideally suited for the world of 'air taxis.' Companies such as Uber and Lyft—who already have great experience in offering rides to anyone with a valid credit card—may lead the charge in having air taxis become a viable commercial reality. Hyundai has already developed a commercial relationship with Uber.

International auto manufacturers are now seriously diversifying from their business beyond ground vehicles in a thrust to extend their product line. These include, among others, Toyota Motor Company, Stellantis, Mercedes-Benz, and Honda.

GLOSSARY OF TERMS

Terms herein generally follow 3GPP (third generation partnership project) standards, but with clarification where needed. Jargon, ambiguous terms, and unhelpful acronyms are avoided. As used herein, "5G" represents fifth-generation (including 5G Advanced), and "6G" represents sixth-generation (and later-generations) wireless technology. A "3GPP network" is a network configured according to standards promulgated by 3GPP (Third Generation Partnership Project). A 3GPP network (or cell or "LAN" Local Area Network or "RAN" Radio Access Network or the like) may include a base station (or "gNB" or generation-node-B or "eNB" or evolution-node-B or "AP" Access Point or "PRAS" premises radio access station, among other names) in signal communication with a plurality of user devices (or "UE" or User Equipment or user nodes or terminals or wireless transmit-receive units) and operationally connected to a core network ("CN") which handles non-radio tasks, such as administration, and is usually connected to a yet larger network such as the Internet. "IoT" or Internet of Things refers to sensors and actuators configured to communicate wirelessly. The time-frequency space is generally configured as a "resource grid" including a number of "resource elements", each resource element being a specific unit of time termed a "symbol period" or "symbol-time", and a specific frequency and bandwidth termed a "subcarrier". Symbol periods may be termed "OFDM symbols" (Orthogonal Frequency-Division Multiplexing) in which the individual signals of multiple subcarriers are added in superposition. Thus a resource element, spanning a single symbol period in time and a single subcarrier in frequency, is the smallest unit of a message. "C-RNTI" (cell radio network temporary identification) is an identification code of a user device. "DRX" (discontinuous reception) refers to devices going into a low-power incommunicative mode periodically. "SSB" (synchronization signal block) and "SIB1" (system information block 1) are system information messages needed for new user devices to register on a 3GPP network. "PUCCH", "PDCCH", "PUSCH", and "PDSCH" are certain managed channels of the 3GPP network. "SNR" represents the signal-to-noise ratio, with no distinction between noise and interference unless specified. "Random" includes both "pseudorandom" (according to a formula), and "true random" (a physically stochastic bit generator). "ID" stands for identification. "AI" stands for artificial intelligence. "NOP" (no operation) is a processor command that causes the processor to proceed to the next address in the execution memory. "LBT" (listen before talk) is a collision-avoidance method wherein a device monitors a channel before transmitting. "SIM" is a subscriber identification module. "LED" is a light-emitting diode. "UV" is ultraviolet. "ACK" stands for positive acknowledgement and "NACK" for negative acknowledgement.

In addition to the 3GPP terms, the following terms are defined. A "sub-network" is a plurality of end devices wirelessly communicating with an "ECU" (electronic control unit), which communicates with a larger network such as a 3GPP network or the Internet. The sub-network may be a "PIN" (personal IoT network), or a "CPN" (customer/corporate premises network) or other collection of wireless devices, with limitations explained below. The sub-network may be configured in a "star" or "hub-and-spoke" architecture in which multiple end devices communicate with a single ECU device. An "end device" is a sensor or actuator tool, triggered by a processor, which uses a transceiver to communicate wirelessly (or maybe wired) with a single ECU device. As used herein, an "ECU" or "hub device" is a member, manager, and gateway device of a sub-network of end devices, and also a user device of a larger network, such as a 3GPP network of the vehicle. If the vehicle is a mass-transit vehicle such as a train or airplane or ship, the private phones and computers of passengers may also log into the internal base station as transient user devices in the usual way. The ECU may be configured to communicate with all of the end devices of its sub-network on restricted links, and also communicate with a base station on regular 5G/6G channels. A "restricted link" is an exclusive communication link between the ECU and one end device. A restricted link may support only certain types of messages; for example, the end device may transmit only data to the ECU, and the ECU may transmit only commands to the end devices. "Upcast" refers to unicast messages from an end device to its ECU on a restricted link, and "downcast" refers to unicast messages from a ECU to a particular one of its end devices on a restricted link. "LC-IoT" stands for low-cost low-complexity low-current low-crosstalk Internet of Things. A "higher authority" refers generally to any entity responsible for overall direction of a network, such as the owner. The "bottom" of a memory refers to the lowest location address such as zero, and the "top" of the memory refers to the highest location address. "Re-boot" means running the boot sequence.

Although in references a modulated resource element of a message may be referred to as a "symbol", this may be confused with the same term for a time interval ("symbol-time"), or a composite waveform or "OFDM symbol", or each character in a demodulated message, among many other things. To avoid ambiguities herein, each modulated resource element of a message is referred to as a "modulated message resource element", or more simply as a "message element", in examples below. A "demodulation reference" is one or more modulated "reference resource elements" or "reference elements" modulated according to the modulation scheme of the message and configured to exhibit levels of the modulation scheme (as opposed to conveying data). A "short-form" demodulation reference is a demodulation reference that exhibits only selected amplitude or phase levels, such as the maximum and/or minimum amplitude or phase levels, from which the receiver can determine any intermediate levels by calculation. A message may be transmitted "time-spanning" by occupying successive symbol-times on a single subcarrier, or "frequency-spanning" by occupying a single symbol-time on multiple subcarriers, whereas "TDD" (time-division duplexing) and "FDD" (frequency-division duplexing) pertain exclusively to duplexing of message pairs.

As mentioned, a "PROM" (programmable read-only memory) can be changed only under certain circumstances such as with a certain voltage applied, a "UROM" (unalterable read-only memory, sometimes called NVROM or non-volatile read-only memory) cannot be changed, a "SD-ROM" (self-destruct read-only memory) is a read-once memory that erases each entry as soon as it is read. As used herein, "ROM" (read-only memory) includes all of those types. In contrast, "RAM" (random-access memory) can be read and written routinely. RAM is generally transitory and volatile, while ROM is usually non-transitory and persistent through power cycles. A "hacker" is anyone attempting unauthorized entry into a network.

FIGURES

Turning now to the figures, the following examples show how sub-networks in a vehicle can provide sufficient security, without significantly impacting the vehicle's 3GPP network.

FIG. 1 is a schematic showing an exemplary embodiment of a vehicle including ECU electronic control units, according to some embodiments. The vehicles referred to herein may be ground vehicles such as an automobiles, trucks, busses, and trains; waterborne vehicles such as boats and submarines; and airborne vehicles such as helicopters and airplanes and air taxis, while in flight or while taxying. As depicted in this non-limiting example, a vehicle 100 includes a 3GPP-compliant network including an internal base station 101, an ADAS (automatic driver assistance system) ECU (electronic control unit) 102, an engine ECU 103, another ECU 104 controlling lights and other things, and an infotainment ECU 105. The internal base station 101 communicates wirelessly 107 with a fixed-site base station 106, or on backhaul with a fixed-site core network. In addition, the infotainment ECU 105 may receive public broadcast transmissions 109 (dash), which generally present negligible security threat, from satellites 108 and other public sources, independently of the internal base station 101.

In this topology, the internal base station 101 and the ECU units communicate wirelessly according to 5G or 6G technology, on managed uplink and downlink channels (doublewide arrows) using very low transmission power corresponding to the short propagation distances involved. Wired links (not shown) may alternatively be provided between an ECU and the internal base station when convenient. The internal base station 101 may be configured to manage the vehicle's operation, and to serve as a central communication link between the vehicle 100 and the rest of the world. Requiring all communications (other than public broadcasting and the like) to pass through the internal base station 101 may provide cybersecurity and better control.

The topology is based on an internal 5G/6G private local network, centered on the internal base station 101, and communicating with ECU user devices that control each major subsystem of the vehicle—that is, a "network star topology". Likewise, each ECU is the manager and gateway of a sub-network of end devices, each end device consisting of a sensor or actuator along with necessary processing power and a wireless transceiver, configured to communicate only with a single ECU, which may be termed a "sub-network star topology". Optionally, one ECU may manage a number of "sub-ECUs" which each have their sub-network of end devices. The overall system may be termed a "nested hub-and-spoke complex", or more simply as "stars-within-a-star". The depicted topology may thereby provide much-needed simplification, reduced manufacturing costs, ease of maintenance, and greatly enhanced cybersecurity in next-generation software-defined vehicles.

Figure 2:
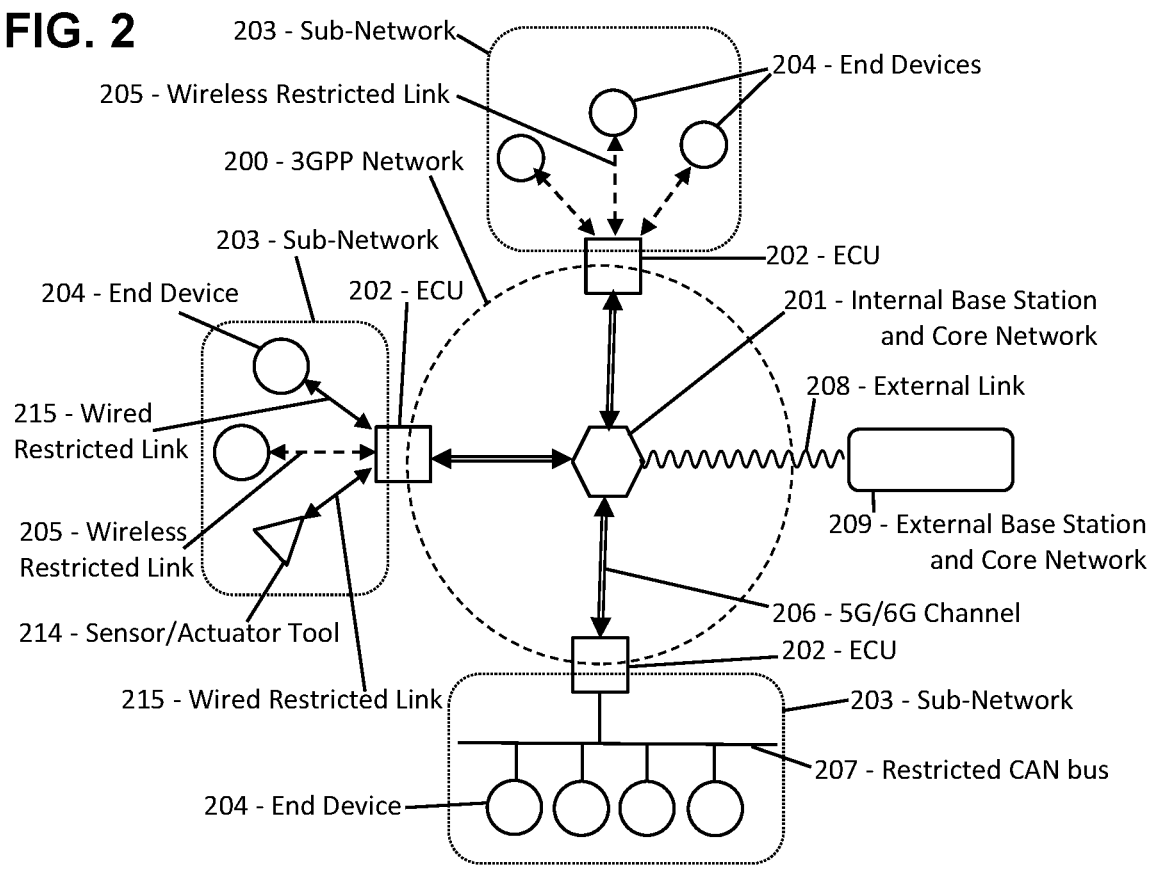
FIG. 2 is a schematic showing an exemplary embodiment of sub-networks connected to a larger managed network, according to some embodiments.

FIG. 2 is a schematic showing an exemplary embodiment of sub-networks connected to a larger managed network, according to some embodiments. As depicted in this non-limiting example, a vehicle-based 3GPP network 200 (dashed circle), such as a 5G or 6G based network, is shown with three sub-networks 203 (dotted enclosures). Each sub-network 203 includes several end devices 204 (circles) in communication with an ECU 202 (squares) via a wireless restricted link 205 (dashed arrow) or a wired restricted link 215 (plain arrow). The ECUs 202 may also directly control a sensor/actuator tool 214 by itself, using a wired restricted link 215 as shown. The ECU 202 can also communicate with end devices 204 using a restricted CAN bus 207. An ECU 202 may also control multiple sub-ECUs (not shown) in a tree-like organization.

The 3GPP network 200 includes an internal base station and core network 201, communicating with the various ECU 202 via 5G or 6G managed channels 206 (doublewide arrows). The internal base station or core network 201 also communicates, using an external Doppler-corrected wireless link 208, with an external fixed-site base station as a user device, or with the fixed-site core network 209 on backhaul. In the depicted embodiment, each ECU 202 manages the end devices 204 of its sub-network 203. The ECU 202 transmits instructions to the end devices 204 on the restricted links 205 215 207, and also receives data messages from the end devices 204 on the restricted links 205 215 207. The base station and core network 201 manage the 3GPP network 200 via the 5G/6G channels 206. Each ECU 202 serves as a gateway between the end devices 204 and the internal base station 201. The 3GPP network 200 may send a message to one of the end devices 204 indirectly, by transmitting the message on a 5G/6G channel 206 to the ECU 202, which then transmits a downcast instruction to the end device 204 on a restricted link 205 215 207. To report data back to the 3GPP network, the end device 204 first transmits the information upcast to the ECU 202 on the restricted link 205 215 207. The ECU 202 may send the data to the base station, or more commonly may send only a summary or status report to the base station when required. By managing the end devices 204 largely autonomously, the ECU 202 may thereby relieve the base station 201 of detailed real-time sensor management responsibilities, which the ECUs 202 are better positioned to handle. In special circumstances, however, the 3GPP network 200 may monitor and direct certain end devices individually, but still communicating exclusively through the ECU 202 gateway, for security.

By avoiding direct communication between the end devices 204 and the base station 201, the 3GPP network 200 is protected from a wide range of cyber attacks. Even in the unlikely circumstance that one of the end devices 204 is somehow compromised, the ECU 202 and the larger network 200 remain protected by the tightly controlled protocols of the restricted links 205 215 207, as well as the cyber protections provided by cybersecurity software in the ECU 202 as a regular user device of the 5G/6G managed network 200.

Figure 3:
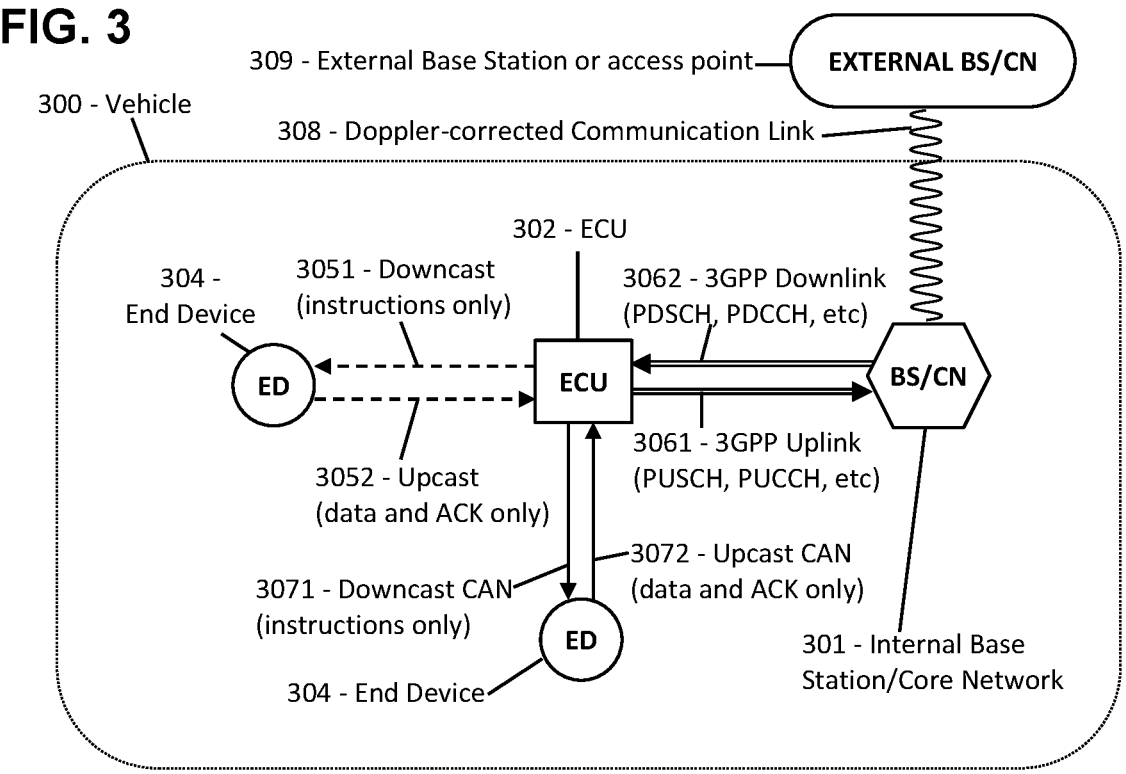
FIG. 3 is a schematic showing an exemplary embodiment of communication between an end device, an electronic control unit, an internal base station, and an external base station, according to some embodiments.

FIG. 3 is a schematic showing an exemplary embodiment of communication between an end device, an ECU, an internal base station, and an external base station, according to some embodiments. As depicted in this non-limiting example, a vehicle 300 includes a vehicle-wide 5G/6G network with a base station 301 and user devices as ECUs 302. A wide variety of sensor/actuator end devices ED 304 communicate with their ECU 302 via restricted links (dashed arrows). In this case a restricted downcast link 3051 is restricted to carry only instructions to the end device 304, and a restricted upcast link 3052 is permitted to carry only raw measurement data or pre-configured answers such as an acknowledgement to the ECU 302. In addition, the ECU 302 can communicate with a wired end device on a CAN bus, including upcast CAN links 3072 and downcast CAN links 3071. The vehicle-wide 3GPP network, centered on base station/core network BS/CN 301, communicates with each user device/ECU 302 via managed 5G/6G channels, such as PDSCH and PDCCH downlinks 3062 and PUSCH and PUCCH uplinks 3061. Not shown are broadcast channels, random access, and a few other special-purpose channels.

The base station/core network 301 also communicates with a fixed-site external base station/core network 309 via a Doppler-corrected communication link 308. For example, the internal base station 301 may present itself as a user device of the remote fixed-site base station 309, or the mobile core network may connect with the fixed-site core network on backhaul, among other possibilities.

The end devices 304 do not communicate directly with the base station 301, nor with any wireless entity other than the ECU 302 which they are assigned to. The end devices 304 receive instructions from, and send measurement data to, their ECU 302 only, in this version. The ECU 302 is responsible for direct management of its end devices 304, and for initial processing of the measurement data, and for passing the data (usually in summary form, or otherwise processed) to the base station 301. In this example, the ECU 302 communicates instructions to the end device 304 in real-time, and receives data or pre-configured answers from the end device 304. The sub-network operates largely autonomously from the 3GPP network in this case.

The example also shows how the 3GPP network may be protected from attack coming through a sub-network. Even if the attacker manages to corrupt one of the end devices 304, the attacker is then able, at most, to transmit bogus measurement data or bogus acknowledgements to the ECU 302, since the ECU 302 is programmed to treat everything coming from the end device 304 as raw measurement data or pre-configured messages such as acknowledgements and alarms. The ECU 302 may be configured to perform averaging or trend extraction or other processed conclusions (collectively termed "summary data") based on the raw measurement data, and pass the summary data to the base station 301 if sufficiently interesting. The ECU 302 may also be configured to check the measurement data for signs of corruption such as unexpected measurement values, among other tasks. The ECU 302 generally does not provide the raw data unless the base station requests it. Each of these steps presents a high barrier to the attacker, thereby protecting the ECU 302 and the larger network from infection. No executable code is ever transferred upcast (unless an attacker does it). If a hacker succeeds in sending executable code, the ECU 302 treats it as raw data for analysis, thereby rendering the hidden code unintelligible and harmless. The ECU 302 does not execute anything received from the end device 304 under any circumstances, in this embodiment. In addition, the ECU 302 is assumed, in this example, to include the same strict cybersecurity protocols as any user device of a 5G/6G network, which generally protects against mistakenly executing data as computer code. In addition, the base station 301 receives only the twice-processed summary data from the ECU 302, thereby destroying any hidden code and further shielding the base station 301 from infection. In addition, the ECU 302 and the base station 301 are programmed to recognize improbable data values and other signatures of hacking, thereby triggering strong defensive actions such as re-booting and self-testing. By these multiple shields, the restricted upcast link 3052 acts as a selective firewall protecting the ECU 302 by enabling only data upcast, and the ECU 302 provides further protection by treating all upcast messages as data or pre-configured replies, thereby effectively protecting the larger network.

Figure 4:
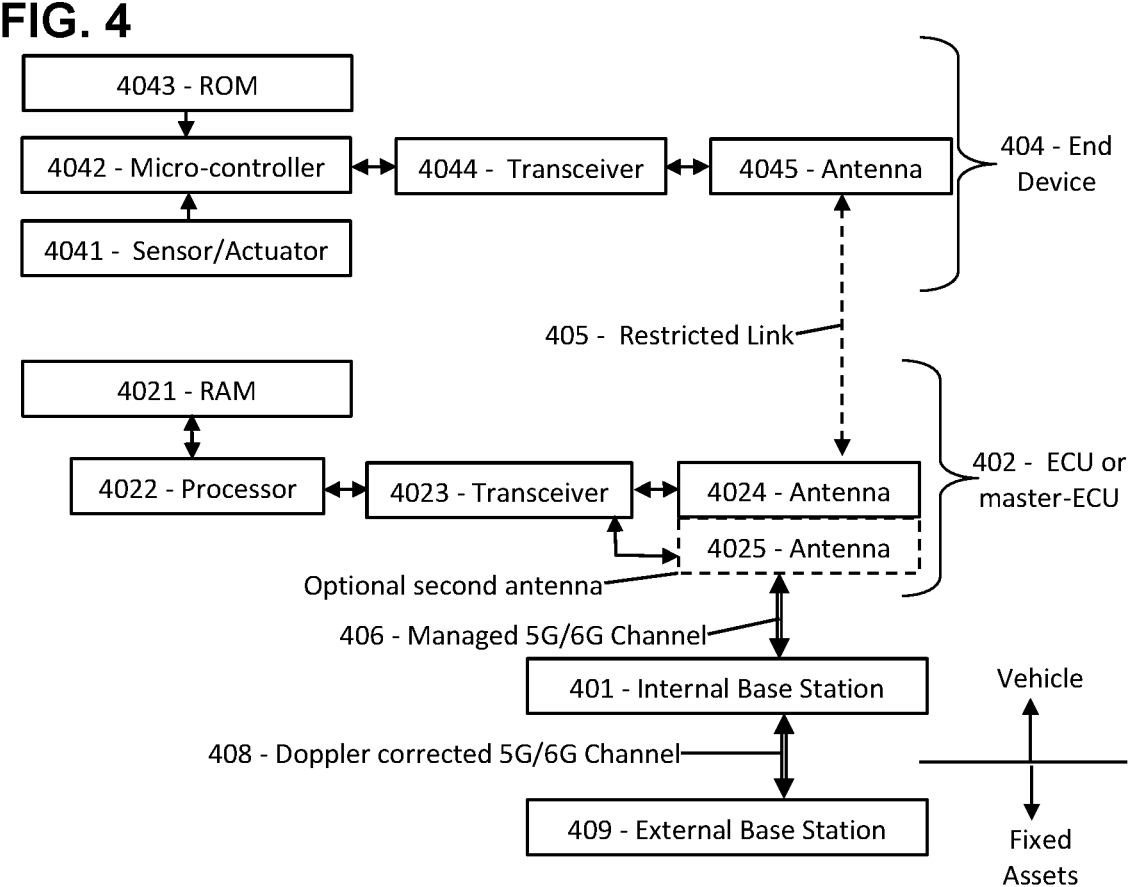
FIG. 4 is a schematic showing an exemplary embodiment of a sub-network communicating with a larger managed network, according to some embodiments.

FIG. 4 is a schematic showing an exemplary embodiment of a sub-network communicating with a larger managed network, according to some embodiments. As depicted in this non-limiting example, an end device 404 of a sub-network communicates with an ECU 402 via a restricted link 405, and the ECU 402 communicates with an internal base station 401 via a 5G or 6G managed channel 406. The internal base station 401 communicates with an external base station or core network 409 on Doppler-corrected wireless links 408 as needed.

The end device 404 includes a sensor or actuator tool 4041 controlled by a micro-controller 4042 which executes instructions contained in a read-only memory 4043. The micro-controller 4042 includes, or is connected to, a radio transceiver 4044 with an antenna 4045 configured for receiving commands and transmitting data to the ECU 402 via the restricted link 405.

The ECU 402 includes a processor 4022 with RAM memory 4021 (and optionally ROM or other memory, not shown). The processor 4022 includes, or is connected to, a transceiver 4023 which has a first antenna 4024 configured to communicate with the end device 404 via the restricted link 405. The ECU 402 is also configured to communicate with the internal base station 401 via the managed 5G/6G link 406. A second antenna 4025 may be required for the 5G/6G communications.

In some embodiments, the end device processor 4042 may be configured to read all addresses in the ROM 4043 as execution instructions only, and may be prevented from reading any address in the ROM 4043 as data (other than a specific single-use key, when so ordered by an installation message). Likewise, the processor 4042 may be configured to read all addresses in a RAM (if present) as data, and may be prevented from reading any RAM addresses as execution instructions. These security measures may prevent a hacker from executing malware in RAM, and may also prevent the hacker from perusing the firmware in the ROM 4043.

In some embodiments, the ECU processor 4022 may include an AI model trained to recognize problems, such as imminent equipment failure, hacker signatures, production bottlenecks, and the like. The AI model may be further configured to recommend responsive actions such as integrity tests that the end devices may perform. The AI model may also diagnose the problem and recommend mitigation.

Figure 5:
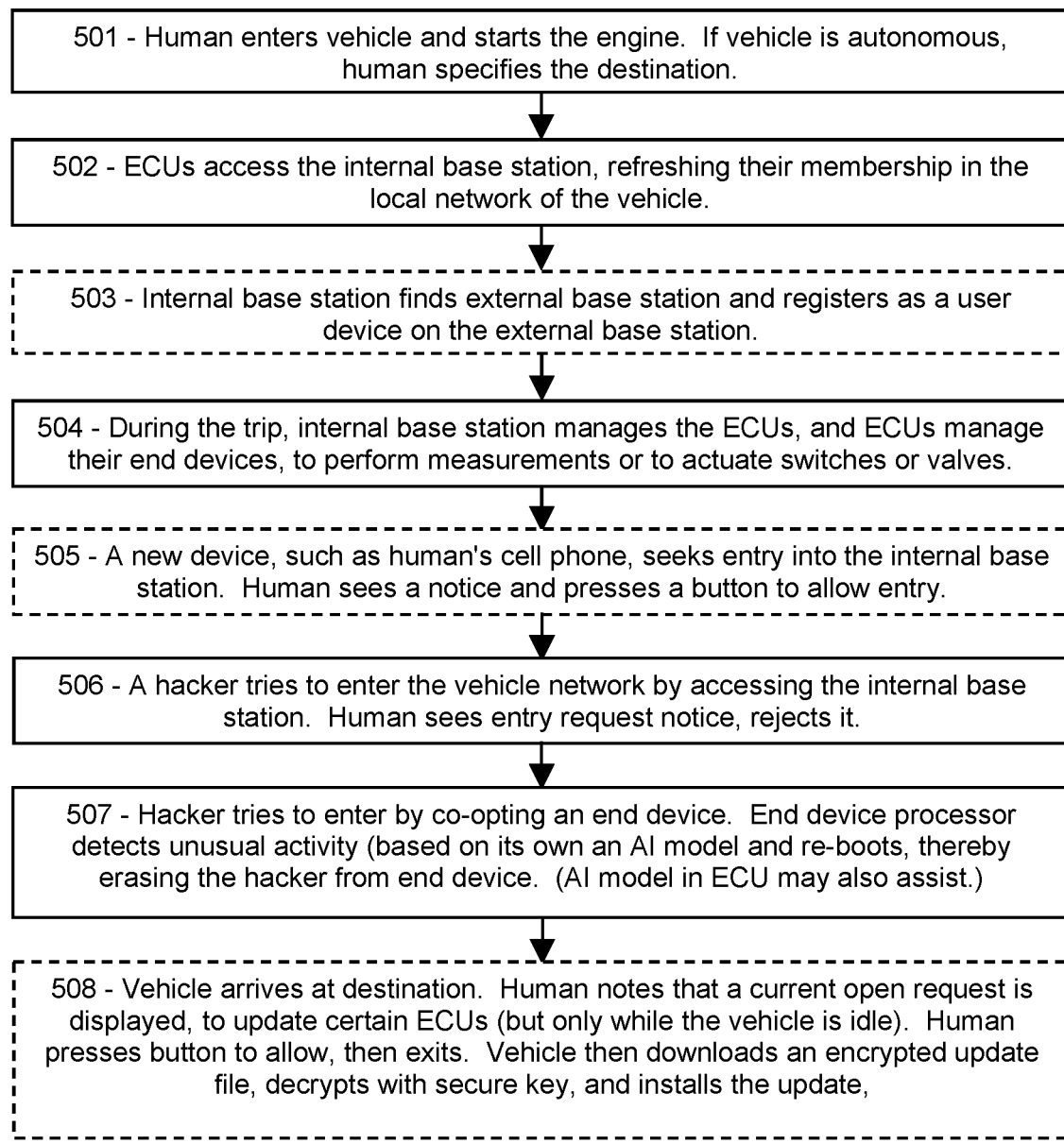
FIG. 5 is a flowchart showing an exemplary embodiment of a procedure for adding an end device to an existing sub-network, according to some embodiments.

FIG. 5 is a flowchart showing an exemplary embodiment of a procedure for adding an end device to an existing sub-network, according to some embodiments. The flowchart items may be executed in any order. As depicted in this non-limiting example, an end device joins a sub-network without compromise of cybersecurity.

At 501 a human enters a vehicle and starts it. At 502, the vehicle's 3GPP network internal base station registers the various ECUs in the vehicle as user devices on the internal base station. At 503, optionally, the internal base station or core network seeks and logs onto a fixed-site external base station. At 504, the internal base station manages the vehicle ECUs to control the engine, provide infotainment, monitor surrounding traffic, watch for hazards, and execute ADAS interventions when needed.

At 505, the human's cell phone seeks entry into the internal base station as another user device. In this version, a new ECU can join the internal base station only upon the human providing a physical enablement such as a button press. Accordingly, the internal base station, or one of its ECUs, displays a notice in view of the human, asking whether the human allows the new device to join. In another embodiment, the internal base station, or one of its ECUs, may recognize the cell phone based on previous registrations, and therefore may admit the cell phone without the physical enablement.

At 506, a hacker probes the internal base station, seeking entry but without proper credentials. Again the vehicle allows the human to decide whether to admit, but this time the human declines the unknown device. At 507, the hacker tries again, this time by attempting to take over or control one of the end devices. However, the end devices are configured to recognize only certain pre-configured commands and to provide only measurement data or pre-configured replies in response, optionally with the aid of an AI model to analyze suspicious activity. The end device processor detects the out-of-spec signaling from the hacker and, in response, re-boots by running the boot sequence, which also erases all RAM and processor registers of the end device, thereby ejecting the hacker. Optionally, not shown, the end device may transmit an alarm message to its ECU informing of the suspected attack, and/or transmit an all-clear message after re-booting and optionally performing self-tests. Optionally, the ECU may assist in analyzing the suspicious activity, using algorithms such as another AI model in the ECU, to further discriminate equipment problems from a cyber attack. In other embodiments, the end device may simply ignore the hacker's unsigned messages, as long as the hacker has not influenced the end device's memory or actions.

At 508, the vehicle arrives at the destination. However, some of the ECUs or end devices are due for firmware updating. In this example, all updates and other firmware alterations are withheld while the vehicle is in transit, for safety. After the vehicle has reached the destination and is put in Park, but before the vehicle power is turned off, the vehicle requests the updating (using a visible notice or voice-like computer speech, for example). The human then provides the physical enablement (button press) to initiate the update, after which the vehicle completes the installation securely, performs various tests, and then turns off the power.

In addition, after the updating, each ECU may require each of its end devices to perform self-tests and report. For each self-test, the ECU may measure the amount of time required by the updated end device to complete the test and reply, thereby detecting any change in response time as possible evidence of a security breach. Such a diagnostic may require asynchronous transmission of the reply message by the end device, in order to obtain sufficient time precision to detect a firmware alteration. The ECU may instruct the other end devices of the sub-network to remain silent until after the self-tests have been completed and reported, to avoid cross-traffic delays.

In a similar way, the internal base station may require each ECU to perform integrity tests after updates, or at other times, to ensure that the ECU updates were performed correctly and to detect irregularities before they can do significant harm. The base station may also measure the time required for the ECU to complete each integrity test and report. However, to obtain sufficient time measurement precision, the internal base station may permit the ECU to transmit the result asynchronously and grant-free, as soon as the test is done, instead of waiting for the next symbol boundary or other delays. The base station may instruct the other ECUs to remain silent until the integrity test is done, or at least during an interval when the reply is expected.

FIG. 6 is a schematic showing an exemplary embodiment of two end devices in a sub-network communicating with an ECU, according to some embodiments. As depicted in this non-limiting example, a first end device 601 and a second end device 602 of a sub-network are in communication with an ECU 603, which is in communication with an internal base station 604. Restricted-link communications in the sub-network are shown dashed, and managed 5G/6G communications in the 3GPP network are shown as doublewide arrows. Time proceeds downward in the figure. However, items may be implemented in any order or omitted.

At 611, the internal base station 604 transmits a message 631 to the ECU 603 indicating that there is tight traffic ahead. At 612, the ECU 603 transmits a downcast instruction 632 to the first end device 601 requesting a measurement of the distance to the cars (or aircraft or ships, etc.) ahead. The downcast instruction 632 causes the first end device 601 to make a proximity measurement and, at 613, to transmit an upcast data message 633 to the ECU 603 indicating the measurement value.

At 614, the ECU 603 transmits a downcast message 634 to the second end device 602, instructing it to actuate a braking actuator or a reduction in propulsion power. At 615, the second end device 602 does so, and then transmits an upcast message 635 indicating that the actuator was successfully actuated.

At 616, the first end device 601 detects that the proximity is changing too rapidly (that is, the rate of change exceeds a predetermined limit) and transmits an alarm message 636 to the ECU 603. At 617, the ECU 603 transmits an immediate downcast message 637 to the second end device 602 to apply the braking actuator harder (or to initiate an evasive maneuver), and at 618 transmits a message 638 to the internal base station 604 warning of the growing hazard and to expect a sudden speed reduction.

Later, at 619, a hacker attempts to intrude into the first end device 601, as indicated at 639, thereby causing the first end device 601 to transmit a bogus data upcast message 640 to the ECU 603 at 620. The ECU 603 receives the bogus message 640, notes that it is an unsolicited message and is not an alarm, and therefore is suspicious. Alternatively, the ECU 603 may determine that the message 640 is meaningless, or in violation of proper sub-network formats, or using an unassigned identification code, among many other features that the ECU 603 could check. Upon determining that there is something amiss with the second end device 602, the ECU 603 then transmits, at 621, an uplink message 641 to the base station 604 requesting maintenance of the first end device 601 (or requesting emergency landing in the case of an infected aircraft in flight). In addition, to ensure that no infection can propagate to the 3GPP network, the ECU 603 may inhibit all further communications with the first end device 601. If the ECU 603 suspects that itself is also compromised, the ECU may self-quarantine by ceasing all further uplink transmissions to the base station (but keeping the receiver open for instructions), until signaled by the 3GPP network that the problem has been resolved.

Alternatively, the ECU and the base station may collaborate in identifying the intrusion and determining what to do about it. For example, the base station may include a versatile AI model trained in interpreting suspicious messages and other signs of a cyber attack, and selecting an appropriate response, such as quarantining the end device or running integrity tests.

Optionally, the ECU 603 may warn the internal base station 604, in the uplink message 641, to handle the uplink request message 641 with care, since the sub-network may be infected. In that case, the internal base station 604 may quarantine the uplink message 641, or erase it after registering the information. The internal base station 604 may also quarantine the ECU 603, and therefore the entire sub-network, until the problem has been resolved (assuming the vehicle can be operated safely without it).

Alternatively, after discovering irrational behavior of the first end device 601, the ECU 603 may cease all transmissions to the internal base station 604, and instead may instruct 642 the first end device 601 to re-boot at 622, which it does at 623 and reports 643 to the ECU. In addition, the ECU may order all of the end devices in its sub-network to re-boot. Each end device would then re-boot from its ROM, and clear all registers and RAM in each end device, thereby erasing any presence of the hacker in the sub-network. Only after verifying that the sub-network is infection-free at 624, the ECU 603 may then transmit an uplink message 644 to the base station 604 informing it of the events and the successful restoration, in this example. At 625, the internal base station 604 re-checks the test results and confirms 646 that the first end device 601 is infection-free. Then, at 626, the ECU 603 instructs 645 the first end device to resume operations.

However, if the first end device 601 continues to act erratically after its re-boot, or fails other system checks that the ECU 603 may order, the ECU 603 may request maintenance of the first end device 601 upon the next garage opportunity (or upon landing, or reaching port, etc.). In the mean time, the ECU 603 may contrive a workaround using other end devices substituting for the first end device 601 if possible.

FIGS. 7A and 7B are schematics showing an exemplary embodiment of sub-network features that prevent various types of wireless cyber attacks, according to some embodiments. As depicted in this non-limiting example, the most common hacking attack methods 701 and 711 are listed on the left, and the features of the disclosed sub-networks that negate those threats are listed on the right 702 and 712.

For example, the first threat type is "Arbitrary Code Execution" in which the attacker injects malware into the victim's execution memory, and the processor executes it. However, as indicated on the right, the end devices disclosed herein defeat that type of attack because they execute code from ROM only, which no attacker can alter. The attacker might conceivably inject malware into RAM of the end device, but if the processor is configured to execute only from ROM, never from RAM, then the attack fails. In addition, the firmware that prevents the operating system from executing RAM instructions may also be contained in ROM or hard-wired in the processor, thereby preventing the attacker from changing the "execute only from ROM" feature.

The other threats such as Backdoor, Advanced Persistent Threat, Zombie, Rootkit, and Bootkit attacks, are defeated for the same reasons—the end device boots from ROM and executes only from ROM. In addition, the end device can be configured to erase all RAM and registers and everything else that an attacker could conceivably alter, upon each re-boot, thereby wiping out the attacker's entire presence. As mentioned, the end device can be configured to re-boot frequently, such as once per second, minute, or hour, or upon transmitting each upcast message, or after each measurement, or after detecting any suspicious behavior, or at random times, to further frustrate the attacker.

The other attack types in the list have similar protections. For example, Keyloggers that record keystrokes are defeated because the end devices have no keyboard and no keys. Privilege Escalation, in which the attacker adds to its privilege status, is defeated because the end devices have no privilege structure. Shellcode attacks, in which the attacker starts a new shell or thread, are defeated because the end devices do not use shells or threads; they only execute sequential pre-configured ROM code, and only in response to an ECU instruction. Cryptojacking fails because the end devices don't use crypto. Email fraud, Spoofing, and Phishing attacks are useless because the end devices have no email. Screen Scraping (recording information displayed on a user's screen) won't work because there is no user involved with the end devices, and anyway the end devices have no screen. All of the attacks involving the Internet are moot because the sub-network is not on the Internet. The remaining attack types are also defeated in a similar way, as indicated on the right side of each item.

In each case, a determined hacker may at most succeed in distorting the sensor data of an end device, or vandalistically triggering an actuator, but this is a trivial annoyance limited to one end device, since all wider infection is prevented by the features listed. In addition, such a limited intrusion may be readily eliminated by a re-boot of the affected end device. The infection goes no farther.

The attack is generally inconsequential if the infection cannot remain long-term in the end device and cannot penetrate into the ECU. All of the attack types listed in FIGS. 7A and 7B fail to infect the ECU, and thus the 3GPP network, for the reasons shown 702 and 712. Hence the disclosed sub-networks are fully cybersecure by 3GPP standards, despite the end devices having none of the advanced cybersecurity software that the 3GPP user devices (including the ECU) are required to implement.

Figure 8:
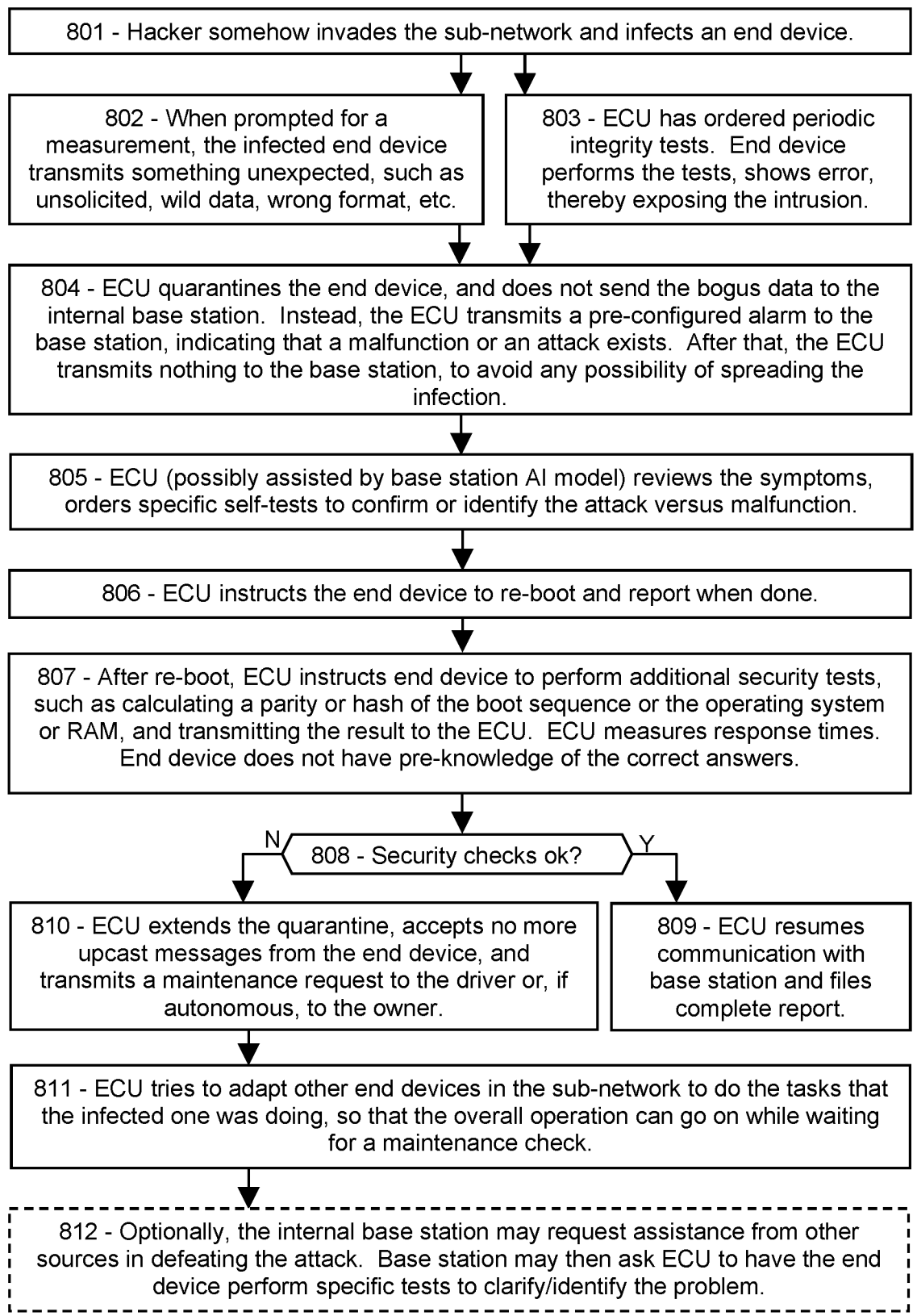
FIG. 8 is a flowchart showing an exemplary embodiment of a procedure for detecting and mitigating a cyber attack on a sub-network, according to some embodiments.

FIG. 8 is a flowchart showing an exemplary embodiment of a procedure for detecting and mitigating a cyber attack on a sub-network, according to some embodiments. The flowchart items may be executed in any order. As depicted in this non-limiting example, the ECU detects the attack based on irregular responses from the infected end device, or a periodic integrity test, and takes steps to contain and eliminate the problem, while protecting the 3GPP network.

At 801, a hacker intrudes into one of the end devices. (This is highly improbable since the end devices are configured to boot from ROM and execute from ROM, obeying commands only from the ECU, and transmitting only measurement data back to the ECU. There is scarcely room for a hacker to do anything to the end device except interfere with the measurement data, which accomplishes nothing. Nevertheless, in this example, we assume the hacker has somehow gotten into one of the end devices.)

At 802, the end device provides incorrect measurement data due to the effects of the hacker, or transmits an upcast message with a format error, or transmits an unrequested result, or other unexpected behavior. Alternatively, at 803, the end device may perform self-tests periodically, or the ECU may order it. The self-tests may include calculating a hash or parity construct of the ROM or RAM of the end device, among many other tests described elsewhere herein, and others. The end device transmits the results to the ECU for checking. At 804, the ECU becomes suspicious due to the erratic results, and quarantines the end device by suppressing or ignoring communications from the end device. In addition, the ECU may inform the vehicle 3GPP network of the suspected problem. To prevent spread of the infection, the message from the ECU to the internal base station may be a pre-determined alarm message, as opposed to something that the hacker may have planted, and certainly not the bogus data that the infected sensor provided (unless the base station requests it for forensic analysis). After that, the ECU may withhold further uplink messages to protect the 3GPP network. Without communications, a cyber attack cannot spread.

At 805, the ECU and the internal base station collaborate in checking test results, determining whether they indicate a malfunction or an attack, and how to proceed. In other embodiments, the ECU may be configured to perform such tasks autonomously. The ECU and/or the base station, may include an AI model trained in detecting signatures of a cyber attack, noise, interference, and sensor failure, based on the available observations including signals picked up by the ECU. At 806, the ECU orders the end device to re-boot and report. At 807, the ECU exercises the suspected end device by transmitting instructions and analyzing the resulting data messages. For example, the ECU may require the end device to perform the same measurement repeatedly to check for excessive noise. The ECU already knows the correct value of each test, but the end device does not. The ECU can then compare the reported answers with the correct values, and thereby determine whether the firmware of the end device has been altered. The ECU may also measure the time interval required for each of the self-tests, and compare to previously-determined intervals for the same tests. The ECU can include an AI model trained to diagnose the problem, including a cyber attack, and to recommend remedial action. The AI model may further analyze those results, which may reveal further information about the attack, such as confirming the presence of the hacker, clarifying the type and extent of the intrusion, and identifying which capabilities remain within the end device's control. In some embodiments, the end device may be capable of doing its own integrity checks, and may be able to do so despite the hacker's interference. For example, the end device may be able to analyze its test results and report its own status as, for example, "likely infected". The end device processor may include another AI-based model, sized for the small micro-controller and trained to discriminate attack signatures from equipment problems, based on sensor data and integrity test results.

At 808, the ECU determines whether the results indicate the infection is gone. At 809, test results are all ok, so the ECU lifts the quarantine, resumes normal operations in the sub-network, and files a report with the internal base station. At 810, on the other hand, the end device continues to fail one or more integrity tests, even after a clean re-boot from ROM. This may mean that the hacker has somehow survived the re-boot, or has regained entry after the re-boot, or that the end device is malfunctioning, or other pathological condition. Therefore, the ECU may make the quarantine permanent, sever the restricted link, and warn the larger network of the problem, and request maintenance for the end device. At 811, the ECU attempts to continue performing the assigned sub-network functions without the infected end device, by drawing on other end devices to cover for the quarantined unit, if possible. For example, the ECU may request additional temperature measurements from other sensors near the malfunctioning one, and may interpolate to determine the likely temperature at the location of the malfunctioning end device. Optionally, at 812, the ECU or the 3GPP network may request assistance from other sources in dealing with the cyber attack. For example, the vehicle's base station may use the Internet to find advice and examples from national cyber databases and federal agencies that may be available to help.

In some embodiments, each end device may be programmed to perform its own tasks, and also may be programmed to perform the tasks of other end devices when so commanded. This may enable the ECU to enlist the help of other end devices when one of them is compromised. In other embodiments, each critical end device may be paired with a second end device, closely proximate, and configured to perform the same function when needed. For example, when one end device is taken off-line due to hacking or failure or whatever reason, the other end device with redundant capabilities can be ordered to perform the missing functions, and thereby enable the overall operation to continue until the damaged or corrupted unit is replaced.

Figure 9:
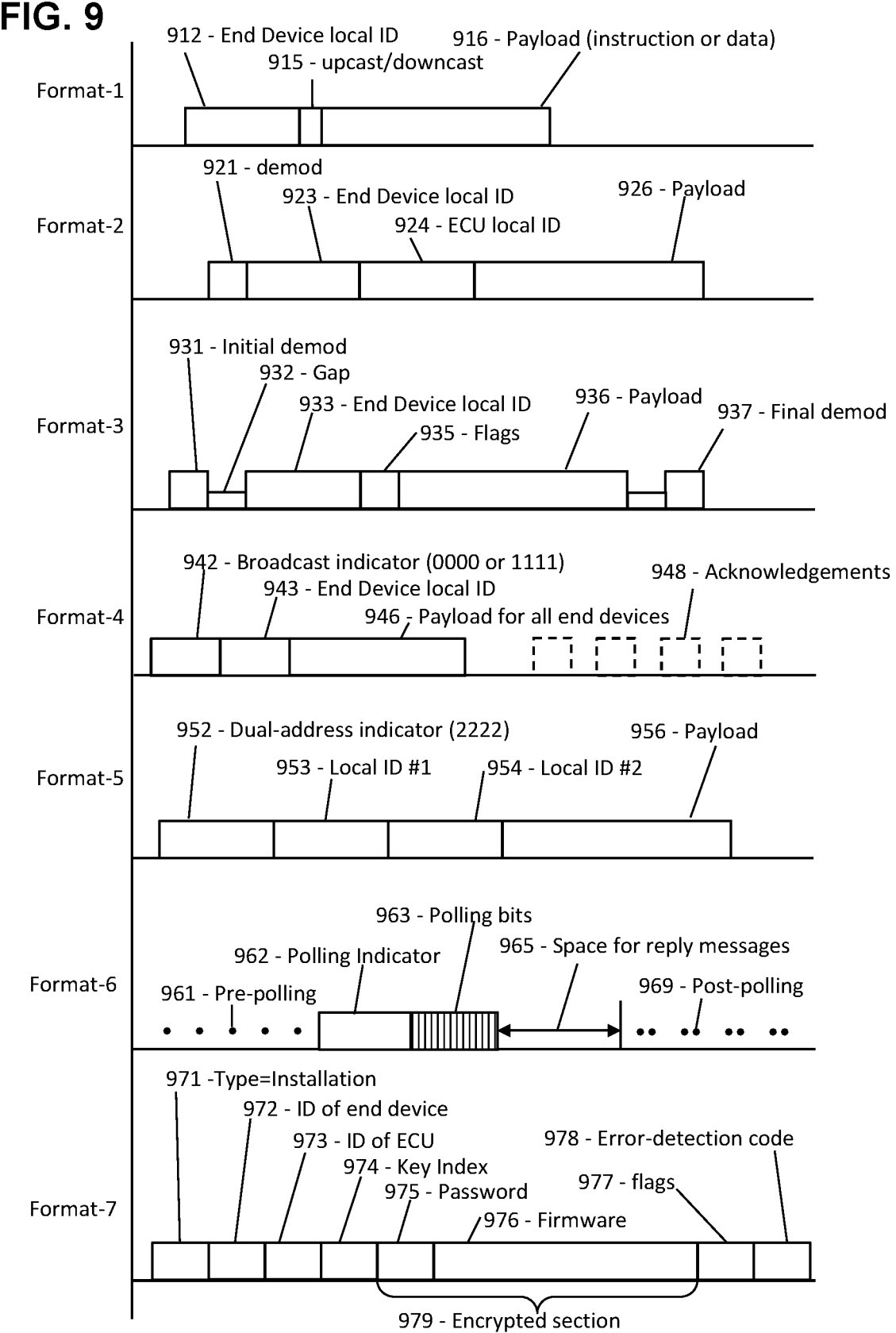
FIG. 9 is a schematic showing an exemplary embodiment of various formats of messages between an end device and a manager device of a sub-network, according to some embodiments.

FIG. 9 is a schematic showing an exemplary embodiment of various formats of messages between an end device and its ECU in a vehicle, according to some embodiments. As depicted in this non-limiting example, each message on a restricted link, between an end device and its ECU, may be configured according to a predetermined format such as those shown in the figure. The messages may be time-spanning or frequency-spanning, or both.

Format-1 depicts an internal sub-network message including the local identification 912 of an end device, then a single-bit indicator 915 set to 0 or 1 indicating whether the message is upcast or downcast, followed by a payload 916. The same format can be used for both upcast and downcast messages. For downcast, the end device ID 912 is the intended recipient and the payload section 916 is an instruction such as "take a measurement"; if upcast, the ID indicates the transmitting end device, and the payload is the measurement value or status message. Format-1 does not include the ID code of the ECU, since in a star topology, all messages that the ECU did not send are intended for the ECU, since there are no other options. Likewise, all downcast messages are transmitted by the ECU. Absent conflict with another sub-network, the ECU ID may not be needed. As mentioned, close vehicle-vehicle proximity is expected to be brief and infrequent, and therefore address conflicts are expected to rarely be an issue, and when it does occur, the ECUs have many options for mitigation as discussed above.

Format-2, on the other hand, includes the ECU identification, thereby avoiding address conflicts when another sub-network is within radio range. Two vehicles with in which the sub-networks happen to use some of the same local identification codes, and temporarily within radio range of each other, may mistakenly receive each other's messages, leading to address conflicts. Therefore, in Format-2, the ECU is identified in each upcast or downcast message, thereby specifying explicitly the sub-network involved, and resolving the problem.

In the depicted example, a message according to Format-2 starts with a demodulation reference 921 "demod", for demodulating the message. The demodulation reference 921 may be a short-form demodulation reference, which exhibits two modulation levels, from which any remaining levels can be determined by interpolation. The abrupt transition between the two modulation levels of the short-form demodulation reference may serve as a timestamp point or phase-tracking reference signal. The recipient (or any other member of the sub-network) may receive the demodulation reference 921, and may adjust its time-base according to the timestamp point, thereby synchronizing with the ECU and, by extension, with the vehicle's 5G/6G network. The local ID of the end device 923 and the ECU 924 are then followed by the message payload 926. Messages intended for one sub-network that are received by another sub-network may be ignored as soon as the recipient determines, from the ECU identification code 924, that it is listening to the wrong sub-network.

The example shows the end device identification code placed before the ECU identification code for both upcast and downcast. In a second version, upcast messages may place the end device identification first, followed by the ECU identification, whereas downcast messages may place the ECU first. Hence, in that case, the transmitting entity comes first. In a third version, the ECU ID may be first in upcast messages, and the end device ID first for downcast, thereby identifying the receiving entity first. In a fourth version, both upcast and downcast messages may identify the ECU first, followed by the end device ID, thereby identifying the sub-network first. Artisans may devise other arrangements of the ID codes in sub-network messages, after reading this disclosure, without departing from the principles herein.

The example shows a demodulation reference which may include an abrupt phase or amplitude change at a particular time, between the first and second portions of the short-form demodulation reference, thus providing a useful timestamp point from which each end device may synchronize with the ECU. For example, the ECU can first calibrate its time-base according to the 3GPP network using 5G/6G protocols, and can then transfer that timing to the sub-network by transmitting timestamp points periodically. The timestamp point may be a single symbol-time of transmission or, for greater precision, a sudden change of modulation (such as the sudden change in the middle of a short-form demodulation reference), from which the end devices can synchronize its time-base. In some cases, higher bandwidth may be necessary to sharpen the time resolution, such as briefly switching to 30, 45, 60, or 75 kHz bandwidth, or a higher bandwidth, for the brief demodulation reference. If, however, the transmission is restricted to 15 kHz bandwidth, the end devices can still obtain precise timing by correcting the measured timestamp time analytically to account for the distortions due to the bandwidth limitation. By either method, the end devices can synchronize with the ECU. In some embodiments, sub-network communications are required to obey the frame schedule of the larger network by modulating each message element of each upcast or downcast message within the symbol boundaries of the larger network. In addition, by comparing successive timestamp points, the end devices can also calibrate their frequency to the ECU, and ultimately to the larger 3GPP network. The message formats of this example may thus provide sufficient synchronization of the sub-networks, without the complex synchronization procedures required for 3GPP communications.

Format-3 begins with an "initial demod" 931 demodulation reference, and ends with a "final demod" 937 at the end of the message. The initial and final demods may differ in, for example, the order of two exhibited modulation levels, so that the recipient can readily determine the start and end of the message. In addition, the recipient can calibrate the modulation levels of the message according to the received modulation values of the demods, thereby enhancing reliability as well as synchronization timing.

After a short gap 932 of no transmission, indicated here and elsewhere as a short box, the message then includes the local ID of the end device 933. A set of flags 935, or single-bit indicators, may indicate parameters such as whether the message is upcast or downcast, the presence or absence of the ECU identification in that message, the presence or absence of the final demod at the end of the message, whether part of the message is encrypted, and other parameters. The payload 936 follows, then another gap, then the final demodulation reference 937. The two demodulation references 931, 937 may assist the receiver in demodulating the message. The first gap 932, following the initial demod 931, may provide time for the recipient to adjust its timing and modulation phase levels according to the modulation levels exhibited in the initial demod 931, before the message begins. The flags 935 may disambiguate the message parameters.

The ECU may transmit or broadcast a message to its end devices, indicating which format to use. When traffic is light and no address conflicts are detected, the ECU may allow Format-1. If conflicts occur, the ECU may switch to Format-2, or to Format-3 to mitigate a noisy environment.

Format 4 is for broadcast messages from the ECU to all of its end devices in a particular sub-network. In the depicted case, the broadcast message begins with a broadcast indicator 942 such as all-zero or all-ones, for example. The all-zero indicator may indicate that the broadcast message does not require acknowledgement from the end devices, whereas the all-one indicator may indicate that an acknowledgement is required.

The ID 943 of the transmitting ECU then follows, then the payload 946. For example, the payload may specify transmission parameters to all of the end devices simultaneously, such as a schedule when transmissions are permitted, format conventions, whether a demodulation reference or a gap is required, among many others. Since broadcast messages are expected to be rare and of high importance, in some embodiments the globally unique ID of the ECU may be used instead of the local ID. The end devices, upon detecting the broadcast indicator 942, may then recognize the ECU long-form ID code and thereby determine whether the message is for them If acknowledgements are required, the end devices may transmit them sequentially after the broadcast message 946 in a particular order. For example, each end device that receives the broadcast message can transmit a single-bit pulse signal at the end device's pre-assigned time following the broadcast message. The order or sequence of acknowledgement pulses may be predetermined, such as the numerical order of the identification code of each end device, or other order specified by the ECU. Each acknowledgement 948, in dash, may be a single symbol-time transmission, transmitted at the time allocated for each end device. Any end device that fails to receive the broadcast message does not transmit an acknowledgement pulse, thereby leaving a gap in the reply sequence. The ECU, knowing the sequence, can then determine from the missing acknowledgements, which end devices have failed to receive the broadcast message.

Format-5 is for dual-address messages such as those transmitted to two end devices at the same time. For example, a dual-address message may prepare two end devices, in advance, for a cooperative or simultaneous action. The format begins with a dual-address indicator 952, which in this case is all-twos, followed by the local identification codes of two end devices 953, 954, and then the payload 956. Other end devices, not listed in the message, can interpret the dual-address message as an order to remain silent until the listed end devices have completed their operation.

Format-5 may also be used by the end devices to transmit an alarm message. For example, the indicator 952 may be all 9's for an alarm condition, the first local ID 953 may be the end device's identification, the second local ID 954 may be the ECU's identification, and the payload 956 may be the pre-configured alarm information. In this way an end device can inform the ECU of the alarm without address ambiguity and, since the alarm format is totally pre-determined, without putting the ECU at risk.

Format-6 is for polling messages, in which the ECU periodically indicates which end devices have a message on hold. The ECU holds messages or task orders for its end devices while they are in DRX sleep mode, and then transmits the messages when the end devices indicate that they are ready to resume operations. The polling message includes a "type" field indicating that the message is a polling message. For example, the polling indicator 962 may be all fives, thereby enabling the end devices to discriminate polling from broadcasting. The polling message also includes a sequence of polling bits 963, each polling bit corresponding to one of the end devices. Each polling bit is set, by the ECU, to 1 if the corresponding end device has a message waiting, or 0 otherwise. Following the polling message is a blank space 965 in which the end devices that have messages on hold can request them by transmitting any brief signal in the blank space 965, at a position pre-assigned to each end device. The ECU determines, from the positions or times of the reply pulses, which end devices request their messages.

The clocks of the sleeping end devices may drift out of alignment with the ECU during long sleep cycles. To help the end devices get back into synchronization, the ECU may transmit pre-polling indicators 961, which in this case are brief single pulses spaced apart and transmitted by the ECU before the polling message. The polling message is also followed by post-polling indicators 969 which in this case are double pulses, also spaced apart in time. An end device that wakes up too soon can determine that the polling message is imminent by detecting the pre-polling indicators, and can determine that the polling message has already passed by detecting the post-polling indicators. The end device can then adjust its clock rate and clock setting, so as to wake up at the proper time before the next polling message.

Format-7 is for updating the firmware of an end device. When the boot sequence or operating system of an end device needs to be altered, the ECU may instruct the end device to install new firmware wirelessly using an installation message. According to Format-7, an installation message may include a Type field indicating that it is a firmware update installation message, then the ID of the end device 972 and the ID of the ECU 973, followed by an index 974 indicating which single-use key to use for decryption, a password 975 for enabling the PROM write function, the new firmware, a set of flags 977, and finally an error-detection code such as a hash or parity construct or CRC of the message. The portion indicated by 979 is encrypted by the single-use key which is pointed to, in the key table, by the index 974.

Optionally, and preferably, the long-form identification codes of the end device and the ECU may be provided instead of the the local ID, further disambiguating the intended action. Numerous other safeguards may provide security comparable to that of the larger network. Upon receiving the installation message, the end device may turn off its receiver or otherwise ignore incoming signals to prevent interference during the updating process. The end device can then calculate the error-detection code of the as-received message, and may compare the calculated value to the provided error-detection code 978, thereby determining whether there was a reception fault or some kind of cyber attack or other problem with the message. If so, the end device may transmit an alarm or NACK to the ECU, and other steps depending on implementation. In addition, if the installation message is erroneously received by another end device, possibly in a different sub-network, that end device can ignore it since the ECU ID does not match. If the wrong end device tries to install it anyway, the procedure would fail because each end device has a different set of single-use keys. If the error-detection code 978 agrees with the calculated value, the end device can retrieve the single-use key from a hidden key table according to the index 974. The end device can then decrypt the password 975 and the firmware 976 using the single-use key. (Optionally, for greater security, the password 975 may be encrypted by a second one of the single-use keys, such as the key positioned after the one indicated by the index, in which case both of the used keys would be discarded after the single usage.) The end device can then activate the PROM write-enable function using the decrypted password 975, and can copy the decrypted firmware into the write-enabled PROM. The end device can then erase any RAM and registers used, then begin executing at the first location in the boot sequence, thereby causing the end device to re-boot, and then execute the operating system as usual.

An ECU can also prevent a hacker from transmitting a bogus installation message directly to an end device which the ECU did not transmit. In response, the ECU can immediately begin transmitting noise at maximum power, which will interfere with the bogus command, causing message faults, and thereby thwarting the attack.

Figure 10:
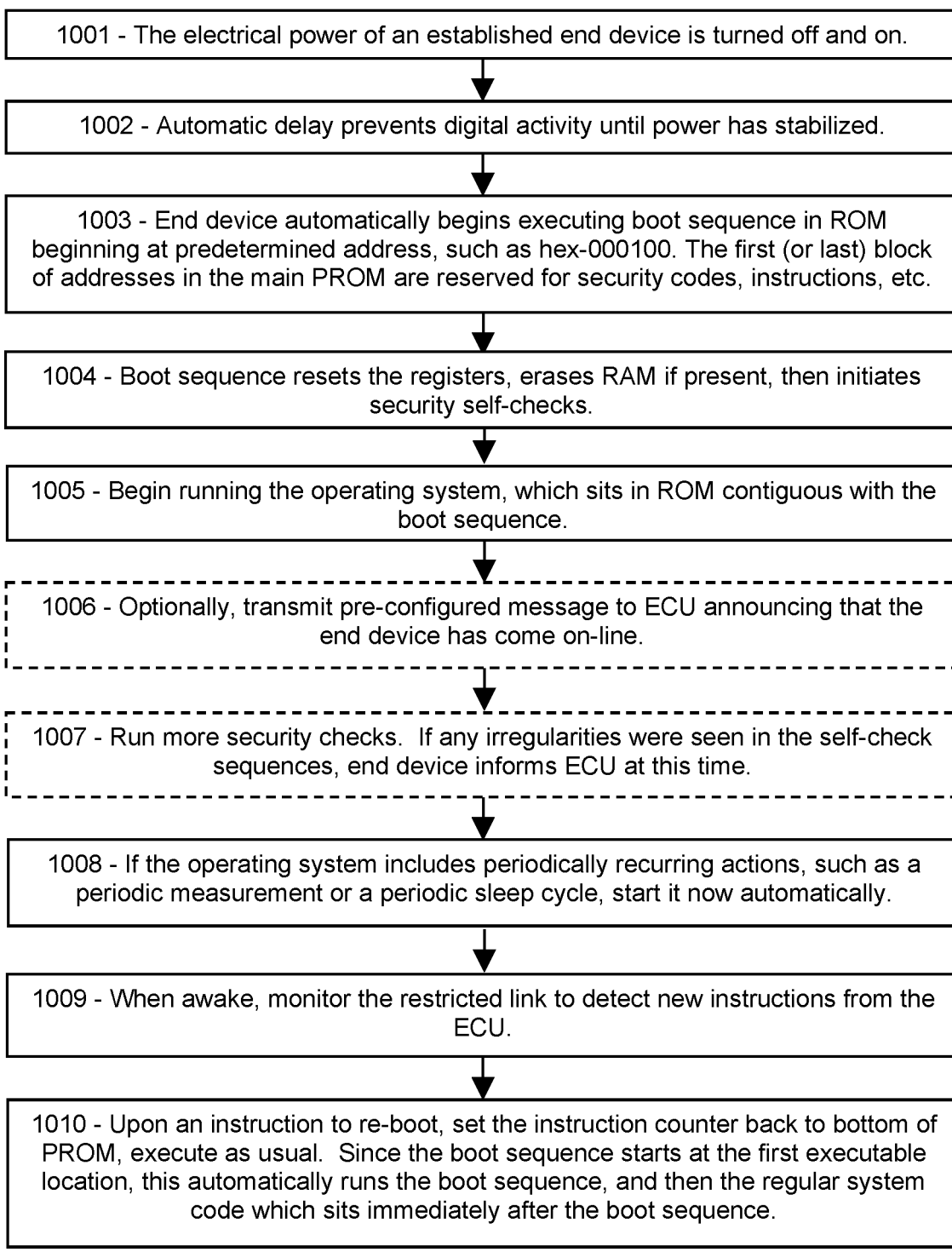
FIG. 10 is a flowchart showing an exemplary embodiment of a procedure for a sub-network to mitigate a hacking attack, according to some embodiments.

FIG. 10 is a flowchart showing an exemplary embodiment of a procedure for a sub-network to autonomously re-boot, according to some embodiments. The flowchart items may be executed in any order. As depicted in this non-limiting example, after a power failure or other shutdown, an end device may automatically start its ROM-based boot sequence, enter the operating system, and await ECU instructions.

At 1001, a particular end device, which has previously been a member of a sub-network or has otherwise obtained a local identification code, is powered up. Then at 1002, a built-in delay inhibits the processor from executing any instructions until the power has stabilized. At 1003, the power-up delay has expired, and the end device processor automatically begins executing instructions in ROM, starting at a predetermined location, such as the lowest executable location in the ROM. The operating system may be positioned above the boot sequence and therefore starts after the boot sequence. (Alternatively, the last instruction in the boot sequence may be a jump to the first instruction of the operating system, located somewhere else in the ROM.)

Certain locations in the ROM may be reserved. For example, the first or last group of locations in the ROM, or some other region such as immediately after the end of the operating system, may be reserved and not executable. The reserved locations may contain special data such as the single-use key table or other security values. The reserved locations may contain executable code such as detailed instructions for updating the firmware in the ROM. The reserved locations may contain pre-configured replies such as acknowledgements and alarm message templates.

At 1004, as part of the boot sequence, the end device erases all of its built-in registers and RAM, if present. This ensures that unwanted residue is erased, including secret keys and calculations, any malware or attack functions that have been injected by an attacker, and anything else that an attacker may try to exploit.

At 1005, after finishing the boot sequence, the processor reaches the operating system and optionally, at 1006, transmit an upcast message to the ECU announcing that the end device has re-booted and is now ready for service.

At 1007, according to instructions in the boot sequence or the operating system or a message from the ECU, the end device runs a series of self-checks. These may indicate its system integrity and its ability to perform its functions such as reading a temperature sensor or turning a switch on and off. For example, the end device may calculate a hash or parity of the firmware, or other security check on the current operating system code, and transmit the results to the ECU.

The ECU may quarantine the end device or take other defensive action upon any fault.

At 1008, the end device may automatically begin performing its programmed task, such as periodically making a measurement and transmitting the results to the ECU. In one version, the operating system or boot sequence may specify that the end device is to automatically start performing measurements, without waiting for a command from the ECU. However, the ECU can interrupt such an automatic cycle with an abort command, and can re-start the cycle at a later time. In a second version, the end device may wait for the ECU to tell it when to begin the cycle. An advantage of waiting for the ECU command to begin a periodic action (such as a measurement or a DRX sleep cycle) may be that the end device can thereby maintain synchrony with the ECU, since the ECU knows when the end device will be awake or make measurements.

At 1009, during each awake interval, the end device may monitor the downcast link for instructions from the ECU, such as instructions to acquire data or to activate an actuator. Alternatively, at 1010, the ECU may instruct the end device to re-boot. The end device may then cause a re-boot, for example by clearing the instruction address counter, which causes the processor to begin executing at address zero or the first executable address in PROM, which in this case is the boot sequence.

Figure 11:
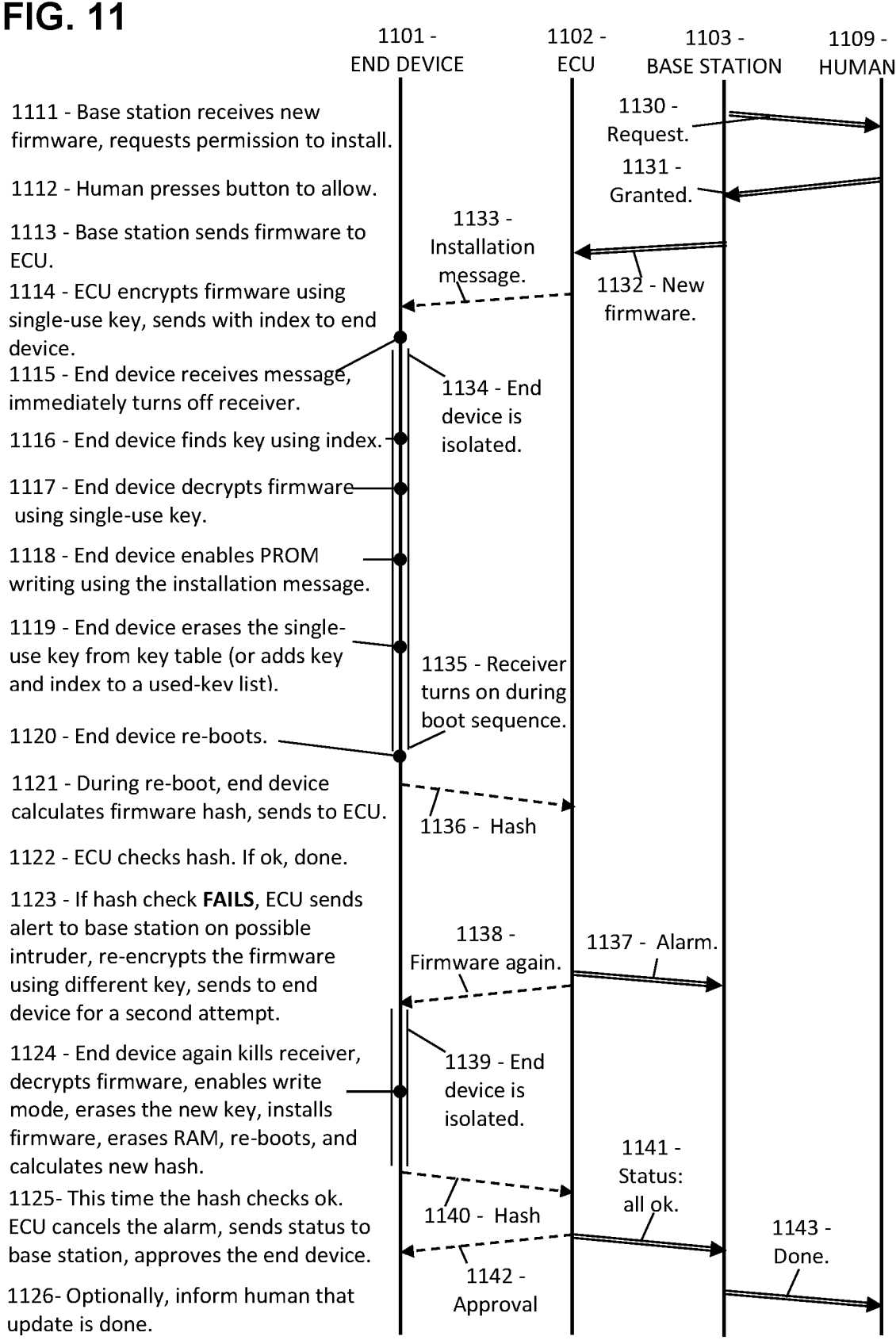
FIG. 11 is a schematic showing an exemplary embodiment of a procedure for updating the firmware operating system of an end device wirelessly, according to some embodiments.

FIG. 11 is a chart showing an exemplary embodiment of a procedure for securely updating firmware in an end device, according to some embodiments. As depicted in this non-limiting example, the ECU wirelessly updates the PROM firmware of an end device, while maintaining the same high level of security as the 3GPP network.

Across the top are shown an end device 1101 and its ECU 1102, the vehicle's internal base station 1103, and a human 1109 such as the vehicle driver or pilot. Time proceeds downward in the figure, however certain items may be omitted or implemented in a different order.

At 1111, the base station receives an update order from an authorized source, such as the vehicle manufacturer. Before proceeding, the base station displays a request 1130 to the human, requesting permission to install the update. If convenient and safe, the human then approves the update at 1112 by providing a physical enablement such as a button press 1131. For safety, the base station may withhold the installation request as long as the vehicle is in motion or in gear, waiting until the vehicle has stopped and the gearshift is in Park, for example. The request message may be accompanied by a characteristic tone to ensure that the human is aware. At 1113, the base station detects the physical enablement and then transmits the firmware 1132 to the ECU via a protected and encrypted downlink channel of the local 3GPP network of the vehicle.

The end device includes a table of single-use keys, known to the ECU, and uniquely associated with the end device. Each end device has different keys. At 1114, the ECU selects a single-use key from the key table, and encrypts the firmware using that key. The ECU then transmits an installation message 1133 to the end device in a downcast link. The installation message 1133 is formatted as an instruction. It includes the encrypted firmware, an index indicating the location of the key in the key table, sufficient identification such as the long ID code of the end device and the long ID code of the ECU, and optionally a hash or parity construct of the message. Importantly, the installation message does NOT include the single-use key itself, either plain or encrypted.

At 1115, the end device receives the installation message 1133 and immediately turns off (or disregards) its receiver. The end device then verifies the identification codes and the included hash, rejecting the message if any disagreement. At 1116, the end device uses the index to retrieve the correct single-use key from its key table, and uses the single-use key to decrypt the firmware at 1117. The single-use key table of the end device is stored in non-executable addresses of its system PROM, or in a separate UROM, or permanently encoded in the processor itself, or hidden among the boot or system firmware, or elsewhere according to the installation. The single-use key table may be installed during manufacture of the end device, or inserted later using a physical enablement, or other secure manner. For security, the end device may be configured to read addresses in the system PROM only as execution addresses, and not as data, except for certain addresses containing the key table, and can access those addresses only using an installation message, and only the address corresponding to the index in the installation message. In addition, the end device processor may be configured to read each entry of the single-use key table as zero or NOP when reading for execution or for data, absent the installation message. Thus the installation message authorizes or enables the processor to read the correct single-use key as data (the "type" field of the installation message may do this). After reading, the processor may erase or obfuscate that entry in the key table to prevent re-use. The installation message may also include an encrypted password for unlocking the write-enable function of the PROM, and an error-detection code of the encrypted or decrypted firmware or of the installation message. All of this is contained in a single unbroken downcast transmission in a predetermined format, which the end device interprets using an installation routine. The installation routine may reside in the old firmware or permanently embedded in a separate memory of the end device.

The end device may then calculate the error-detection code of the as-received message. If it disagrees with the provided error-detection code, the end device rejects the installation message, turns its receiver back on, and transmits a NACK to the ECU. (See below for an alternative error-detection procedure.) Upon receiving the NACK, the ECU encrypts the system code again using a different single-use key, and transmits the entire message again. Alternatively, the ECU may instruct the end device to re-boot first, and then run security tests, and only then may attempt the update if the end device passes all the security tests, and may quarantine the end device if the tests fail.

At 1118, the end device prepares to install the new firmware in the PROM memory by activating a write-enable function of the PROM using a password. In a first password version, the password may be provided in the update installation message, encrypted along with the operating system. The end device can decrypt the password and then use it to update the PROM. In a second password version, the password may be hidden somewhere in the old or new operating system. In one version, the end device knows (according to a routine in the old or new firmware) the location and configuration of the hidden password. In a third password version, the hidden location is revealed by the ECU in the installation message, encrypted along with the firmware. In a fourth password version, the password may be divided into two portions, one of which is provided in the installation message and the other portion is hidden in the old or new operating system. In a fifth password version, the password may be encrypted by a second single-use key, such as the next one in the table (that is, at the index plus 1), in which case the end device retrieves that key also and decrypts the password separately from the firmware. The end device knows which method, or other method, is used to provide the password, and therefore can readily find and decrypt the hidden password.

After activating the write-enable feature, the end device then copies the decrypted firmware into the PROM. In a first decrypting version, the end device stores the firmware as-received in RAM, then decrypts it into more RAM, then copies the decrypted firmware from the RAM into the PROM starting at the first executable address.

In a second decrypting version, the end device decrypts each symbol or message element of the firmware while the installation message is being received, and immediately copies the decrypted bits into the RAM. For example, the index of the single-use key, and the encrypted password, may be provided in the installation message before the encrypted firmware. The end device can then retrieve the single-use key and use it to decrypt the firmware while the rest of the message is being received. The end device then stores each line of the decrypted firmware in RAM. The end device may then calculate an error-detection code from the decrypted firmware and compare to a value provided in the installation message. If the decrypted firmware fails this test, the end device may abort the installation by erasing the RAM copies of the firmware, turning the receiver back on, and sending a NACK or other warning to the ECU. But if the decrypted firmware appears correct, then the end device can copy the firmware from the RAM into the PROM and proceed to run the new boot sequence.

In a third decrypting version, the installation instructions may be provided in a separate PROM, or permanently in a UROM, or embedded in the processor. The end device may execute the installation instructions to demodulate and decrypt each message element of the installation message while it is being received, and write each line of the decrypted firmware directly into sequential PROM addresses, without storing the decrypted firmware in RAM. After copying the firmware, the end device can calculate an error-detection code of the installed firmware and compare to the provided value. If they agree, the end device may proceed to re-boot using the new boot sequence. But if they differ, the end device erases the installed firmware and transmits a NACK to the ECU. (The processor is still executing from the installation routine.) The ECU then sends a second version using a different key. Thus the end device remains in the installation routine until a successful installation has been obtained and fully tested.

In an alternative, the error-detection code provided in the installation message may be based on the decrypted firmware instead of the as-received message, and is encrypted along with the firmware. In that case, the end device calculates the error-detection code values twice—once for the encrypted as-received message, and a second time after decrypting the firmware. Since the end device does not know the correct error-detection code value for the encrypted firmware as-received, it calculates and then transmits that value to the ECU. The ECU replies with ACK or NACK depending on whether the value is correct. If it is ok, the end device then turns off the receiver, decrypts the firmware, and calculates the second error-detection code based on the decrypted firmware, and compares that value to the encrypted value in the installation message. If they agree, the end device copies the decrypted firmware into its PROM. If not, it erases the RAM and the decrypted version and asks the ECU for another message. This procedure thus provides independent tests of both the encrypted and decrypted versions of the firmware.

In some embodiments, the PROM is of the type that can be written line-by-line (that is, one address at a time), while other addresses of the same PROM are being executed by the processor. In that case, there are several ways the new firmware may be copied to the PROM. In a first copying version, the end device may initially move a "copy loop", consisting of processor instructions for copying the firmware, into the highest memory addresses of the PROM. The new firmware may also include the same copy loop instructions, in exactly the same addresses at the top of memory. The copy loop then copies the new operating system from RAM into the PROM, starting at the bottom of the PROM and proceeding upward. When the copy loop finally reaches its own address, the copy loop will over-write each copy loop instruction with the same instruction (that is, no change). The firmware installation may thus be performed without interruption. After reaching the top of memory, the instruction address counter automatically rolls over to zero while generating a carry bit, which causes the processor to proceed to the first address in the PROM, which now holds the new boot sequence, thereby completing the installation.

In a second copying version, the copy loop may be placed at the top of the old firmware, configured to terminate after its last instruction is erased. In that case there is no need for the new firmware to include the copy loop at the top of memory, since it can be copied there later, such as upon the next installation procedure.

In a third copying version, the installation instructions may be provided in a memory other than the main PROM that holds the firmware. For example, the end device may include a second PROM or UROM, which contains the installation instructions, and may execute those installation instructions to update the main PROM.

In a fourth copying version, the installation instructions may be hard-wired in the processor. To trigger the copy loop, the installation message may cause the processor to run the installation instructions from the second PROM or UROM or protected location or embedded in the processor. The last command in the copying instructions may be to begin execution of the new boot sequence in the main PROM.

At 1119, if not sooner, the end device erases the single-use key in the key table at the specified address, thereby preventing its re-use. The end device may also record the key or its index in a used-key list for the same reason.

At 1120, the end device has finished re-booting and automatically resumes execution at the first address of the new operating system. It also turns the receiver back on at 1135. In some embodiments, the last task of the installation instructions or the boot sequence may be to calculate a hash of the new operating system and transmit that hash 1136 to the ECU as a security check at 1121. If the hash is correct at 1122, the ECU transmits an ACK in reply, at which time the end device begins normal operations. If the hash is wrong at 1123, then the ECU may send an alert message 1137 to the base station warning of a possible hacker attack. The ECU may then attempt yet another system update 1138, using a different single-use key, or it may quarantine the end device.

At 1124, the end device receives the second installation message 1138, checks the initial hash, turns off the receiver 1139, retrieves the second key, decrypts the firmware, checks the decrypted hash, retrieves the write-enable password, copies the decrypted firmware into the PROM, re-boots using the latest firmware, performs various self-tests, and transmits the as-installed hash 1140 to the ECU.

At 1125, the ECU checks the as-installed hash 1140 and verifies that it is correct, and that the other self-tests were correct. Therefore the ECU transmits an uplink status message 1141 to the base station canceling the alarm 1137. The ECU also transmits a downcast ACK 1142 to the end device, thereby enabling the end device to resume normal operations. Finally, the base station or the ECU displays a message 1143 to the human indicating that the update was successfully completed.

If the second installation attempt fails, and after some number of updating failures, the ECU may determine that the end device is somehow damaged, in which case the ECU may quarantine the end device, attempt to enlist other end devices as a workaround, and cause the base station to note that the end device needs repair. Depending on the criticality of the end device's tasks, the base station may or may not alert the human that the vehicle needs service, by a message or a dashboard indicator for example. In addition, the base station may latch an indicator to inform a garage mechanic or maintenance chief of the problem at the next repair opportunity.

The procedures of this example may provide enhanced security during wireless system updates, or other software updates, by tightly controlling both information and timing. The single-use keys are stored in secure memory of the end device. The end device cannot read the single-use key table until instructed by the ECU, and even then can extract only the one entry corresponding to the index transmitted by the ECU. In addition, the end device turns off its receiver immediately after receiving the installation message (or after validating the as-received hash), thereby denying a hacker any opportunity to affect the updating. In addition, the decrypted firmware hash can be checked against the value provided (and encrypted) in the installation message. In addition, the password-protected write-enable function of the PROM would require the hacker to determine either an encrypted portion in the message or a hidden portion in the previously installed firmware, or both, (or a second key from the key table), thereby protecting the password at the same level of security as the encrypted firmware. In short, using the disclosed procedure, the ECU can achieve the system update wirelessly, while preventing any outsider from influencing the installation.

The procedures required of the end device in this example are all elementary operations that even a basic microcontroller can perform using native instructions and limited RAM or registers. The attacker, on the other hand, lacks the index, the single-use key, the correct values of the various hashes, and the password. If the hacker figures them out based on the installation message (an impossibility), it is then too late to affect the installation which is already in progress, and anyway the end device disables or ignores its receiver after receiving the installation message. Therefore, using the disclosed processes, the end device can be updated wirelessly, using only low-complexity operations, while maintaining very high cybersecurity.

The example assumes that the encryption is done by the ECU, and the other security parameters are stored in the ECU. In another embodiment, for even tighter security, the base station or core network can store the key table, passwords, and so forth, instead of the ECU. For example, the base station or core network can encrypt the new firmware, and can transmit only the encrypted version to the ECU. The base station or core network then keeps the decrypted versions secure, while the ECU passes the encrypted version down to the end device in the installation message. In addition, the ECU may not know the correct value of the security tests that the end device may perform. Instead, the ECU may pass the results of those tests up to the base station or core network for checking. In that case, all security values are maintained by the base station or core network, and thus would not be exposed even if the ECU is compromised.

FIG. 12 is a flowchart showing an exemplary embodiment of a procedure for securely updating firmware in an end device, according to some embodiments. The flowchart items may be executed in any order. As depicted in this non-limiting example, the ECU wirelessly and securely updates the PROM firmware of an end device.

At 1201, the end device has been pre-configured with a table of single-use keys in its system PROM. For security, the end device may be configured to read addresses in its system PROM only as execution addresses, and not as data (except for a hidden block of addresses containing decryption keys which can be accessed only when commanded by an installation message). The end device may also be configured to read RAM and all other memories, if any, as data and not as executable addresses. For example, the end device's RAM and processor registers are used to hold data only, and therefore cannot appear in the processor's instruction address register. To enforce the execute-only-from-PROM rule, each memory unit in the end device may include a one-bit indicator at each memory location, indicating whether it is data or a processor instruction. The single-use key table is stored in non-executable addresses of the system PROM, such as the first or last addresses of the PROM, or in a separate UROM, or encoded in the processor itself, or distributed among the firmware instructions, among other possibilities. The single-use key table may be installed during manufacture of the end device, or inserted later using a physical enablement, or other secure manner. By these means or others, the end device may be made immune to malware injected into its RAM, and similarly prevents an intruding hacker from reading the key table.

At 1202, the vehicle manufacturer has determined that the end device needs to update its operating system, perhaps to handle a different task or to correct a defect. The vehicle manufacturer sends an update notice to the vehicle. The update notice may include the long ID code of the end device to be updated, or other means for identifying it, as well as the new firmware, and optionally a non-encrypted human-readable description of the changes. The rest of the update notice may be encrypted.

The vehicle base station may then provide an update request to a human, such as the driver or pilot or operator. In some embodiments, the vehicle may withhold the update request until a safe time, such as when the vehicle is stopped. Alternatively, the vehicle may illuminate a lamp or other means indicating that service is needed.

At 1203, the ECU decrypts the firmware if encrypted by the vehicle manufacturer, calculates an error-detection code of the unencrypted version, re-encrypts the new firmware using one of the single-use keys, then transmits an installation message to the end device containing the following: (1) a special instruction to install the new operating system (the "type" field may do this), (2) the identification code of the intended end device (such as the globally unique ID code); (3) the long ID of the ECU, (4) the encrypted boot sequence and operating system, (5) an encrypted password for unlocking the write-enable function of the PROM, (6) an index number or address of the single-use key in the key table, and (7) an error-detection code of the encrypted firmware. The installation message does not include the single-use key in any form. All of this is contained in a single unbroken downcast transmission in a predetermined format which the end device knows. For example, the end device may include an installation routine in its current firmware, configured to perform the installation.

After receiving the installation message, the end device turns its receiver off and calculates the error-detection code of the as-received message. If it disagrees with the value contained in the message, the end device determines that there are reception problems, rejects the installation message, turns its receiver back on, and transmits a NACK to the ECU at 1204. The ECU then encrypts the firmware again using a different key, and sends it to the end device again. In addition, the ECU may make some insignificant change to the firmware before retransmission, to change the error-detection code value of the unencrypted firmware. This change may thereby prevent an eavesdropping hacker from breaking the encryption by correlating the two successive transmissions.

In another embodiment, the installation message may omit the encrypted-firmware hash, keeping it unknown to the end device. Instead, the end device is expected to calculate the hash and transmit it to the ECU, which then checks the value and transmits an ACK if the measured value agrees with the ECU's previously calculated value, after which the end device turns off its receiver. If they disagree, the ECU can send a second installation message with a different key index. As a further alternative, the ECU may instruct the end device to re-boot first, and then run security tests, and only then may attempt the update only if the end device passes all the security tests.

At 1205, (if not sooner) the end device disables the receiver to prevent an attacker from interfering during the installation. At 1206, the end device retrieves the single-use key from the key table using the index provided, and checks a used-key list to determine whether the new key, or its index, has been used before, in which case the end device rejects the installation message. If neither the index nor the single-use key is in the used-key list, the end device adds them to the used-key list to ensure they are never used again, and then proceeds to decrypt the firmware. (Alternatively, see step 1208.)

At 1207, the end device prepares to install the new firmware in the PROM memory by activating a write-enable function of the PROM. The password may be provided in the update installation message, encrypted along with the operating system. Alternatively, the password may be hidden somewhere in the old or new operating system, preferably in a random location that can never be executed. Alternatively, the hidden location may be revealed by the ECU in the installation message, encrypted along with the firmware. Optionally, the password may be divided into two portions, one of which is provided in the installation message and the other half is hidden in the old or new operating system. For extra security, the password may be encrypted using a second single-use key, such as the one at location "index+1" in the key table, instead of the key used for the firmware. The end device knows which method, or other method, is used to provide the password, and therefore can readily find and decrypt the hidden password.

At 1208, (if not sooner) the end device decrypts the new firmware using the single-use key, and copies the decrypted firmware into the PROM at 1209. The end device may also erase the single-use key in the key table at the specified address, at this time or upon first retrieving it, and can thereby prevent its re-use. (If the used key is erased from key table each time, the used-key list may be unnecessary.)

The end device may store the as-received encrypted firmware in RAM, then decrypt it into more RAM, then copy the decrypted version into the PROM. Alternatively, the end device may decrypt each symbol or message element of the firmware in real-time while the installation message is being received, and immediately copy the decrypted bits into the RAM while receiving the next symbol. (This assumes that the index and the encrypted password appear before the firmware in the installation message.) The end device may then calculate the error-detection code from the decrypted firmware while still in RAM, and can compare to a value provided in the installation message. If the hash of the decrypted firmware is correct, the end device can copy the firmware from the RAM into the PROM and proceed to run the new boot sequence. However, if the decrypted firmware fails this test, the end device may abort the installation, erase the RAM, turn the receiver on, and send a NACK to the ECU.

As a further alternative, the end device may have the installation routine in a separate memory such as a UROM, and therefore may demodulate and decrypt the installation message directly into the system PROM while being received. When done, the end device can calculate a hash of the installed firmware and compare to the provided value. If they agree, the end device may proceed to re-boot using the new boot sequence. But if they differ, the end device can request another installation message (still under control of the installation routine), by transmitting a NACK or other message to the ECU. Thus the end device remains in the installation routine, and executes none of the new firmware, until a successful installation has been obtained.

Various versions of the error-detection code are envisioned. In a first version, the error-detection code provided in the installation message is for the decrypted firmware, and is encrypted along with the firmware. Upon receiving the complete installation message, the end device first calculates the error-detection code of the as-received, encrypted firmware, and transmits that value to the ECU. If the value is incorrect, the ECU replies with NACK or a second installation message using a different key. If the value is correct, the ECU sends an ACK and the end device then turns off the receiver. Later, after decrypting the firmware, the end device can check the decrypted firmware using the error-detection code provided in the installation message, without communicating with the ECU. If the hash of the decrypted firmware disagrees with the value provided in the installation message, the end device can abort the process at that time, without installing the questionable firmware, and ask for another installation message. Subsequently, after copying the firmware into the PROM, the end device can calculate the error-detection code of the installed version, and again compare to the value provided in the installation message. If the installed version disagrees, the end device (still under control of the installation routine) can request yet another installation message from the ECU, continuing in this fashion until all checks are passed successfully. This procedure thus provides independent tests of the firmware in 3 stages: the as-received encrypted version, the decrypted version, and the as-installed version, and can reject the firmware on any error without executing any of the firmware. A hacker cannot interrupt the process without causing interference, leading to a hash reject. If the end device requests a retransmission of the installation message, a hacker still cannot insert its bogus firmware because each installation message transmission uses a different key, which the hacker does not know in advance. Therefore the installation is secure.

In some embodiments, the PROM is of the type that can be written line-by-line, one address at a time, while other addresses of the same PROM are being executed by the processor. In that case, there are several ways to copy the firmware into the PROM. In a first copying version, the end device may initially move a "copy loop" of processor instructions into the highest memory addresses of the PROM. (Such a copy loop may be as simple as "COPY A,B; INC A; INC B; JUMP −3".) The new firmware may also include the same copy loop in the same addresses. The copy loop then copies the new operating system from RAM into the PROM, starting at the bottom of the PROM and proceeding upward. When the copy loop finally reaches its own address, the copy loop will over-write each copy loop instruction with the same instruction, after which the firmware installation is done. Then, having reached the top of memory, the instruction address counter automatically rolls over to zero while generating a carry bit, which can send an interrupt that causes the processor to jump to the first address in the PROM, which now holds the new boot sequence, thereby completing the installation.

In a second copying version, the copy loop may be placed at the top of the old firmware, and is configured to terminate after its last instruction is erased. In that case there is no need for the new firmware to include the copy loop at the top of memory, since it can be restored there automatically upon the next installation procedure.

In a third copying version, the installation instructions may be provided in a memory other than the main PROM that holds the firmware. For example, the end device may include a second memory, such as a second PROM or a UROM, which contains the installation instructions. The end device can then execute those installation instructions from the second memory, to update the main PROM.

In a fourth copying version, the copy loop, or the entire installation instructions, may be hard-wired in the processor. The end device can then trigger the copy loop as part of the installation instructions. The last command in the copying instructions may be to return to the lowest executable address of the main PROM upon the rollover carry bit, thereby beginning execution of the new boot sequence.

At 1210, the end device has finished installing the firmware and has finished re-booting, and now resumes execution at the first address of the new operating system. In some embodiments, the installation instructions may include calculating a hash of the new operating system after installation, and transmitting that value to the ECU as a security check at 1211. If the value is correct, the ECU transmits an ACK in reply, at which time the end device begins normal operations. If the value is wrong, then the ECU may transmit a NACK, or may attempt yet another system update, using a different single-use key. After multiple updating failures, the ECU may determine that the end device is somehow damaged, in which case the ECU may quarantine the end device and generate a repair request for the next maintenance opportunity.

The procedures of this example may provide enhanced security during wireless system updates, by tightly controlling both information and timing. The single-use keys are stored in secure memory of the end device. The end device cannot read the single-use key table until instructed by the hub device, and even then can extract only the one entry corresponding to the index transmitted by the hub device. In addition, the end device turns off its receiver immediately after receiving the installation message, thereby denying a hacker any opportunity to affect the updating. In addition, the password-protected write-enable function of the PROM would require the hacker to determine either an encrypted portion in the message or a hidden portion in the previously installed firmware, or both. In short, using the disclosed procedure, the ECU and its end device can achieve the system update wirelessly, while preventing any outsider from influencing the installation.

The updating procedures involve only elementary operations that even a basic microcontroller can generally perform using native instructions and limited RAM or registers. The attacker, on the other hand, lacks the index, the single-use key, the password, and the various error-detection code values. If the hacker figures out all those things based on the installation message, it is then far too late to affect the installation. Therefore, using the disclosed processes, the end device can be updated wirelessly, using only low-complexity operations, while maintaining very high cybersecurity.

The example assumes that the encryption is done by the ECU, and the other security parameters are stored in the ECU. In another embodiment, for even tighter security, the base station or core network of the vehicle can store the key table, passwords, and so forth, instead of the ECU. For example, the base station or core network can encrypt the new operating system, and can transmit only the encrypted version to the ECU. The base station or core network then keeps the decrypted versions secure, while the ECU passes the encrypted version, unchanged, down to the end device in the installation message. In addition, the ECU may not know the correct value of the security tests that the end device may perform. Instead, the ECU may pass the results of those tests up to the base station or core network for checking. In that case, all security values are maintained by the base station or core network using advanced security, and thus would not be exposed even if the end devices and ECU are compromised.

FIG. 13A-13G are charts showing various exemplary embodiments of a memory configuration in an end device, according to some embodiments. As depicted in these non-limiting examples, the secure memory of an end device can include space for a single-use key table, a boot sequence, an operating system, and installation instructions.

Figure 13A:
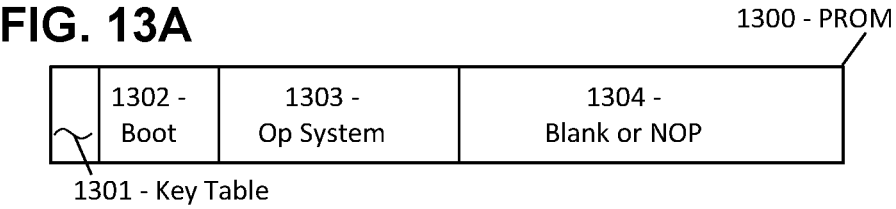
FIG. 13A-13G are charts showing various exemplary embodiments of a memory configuration in an end device, according to some embodiments.

FIG. 13A depicts a secure memory of an end device as a PROM 1300, subdivided into a region for the single-use key table 1301 at the bottom of memory (at address zero), followed by a boot sequence 1302, followed by the operating system 1303. The rest of memory 1304 is blank or zero or NOP instructions, each of which causes the processor to advance to the next location without doing anything. Upon reaching the top address, it rolls over to zero. The processor then skips over the key table 1301 which is non-executable, and continues at the first executable address, which is the boot sequence.

Processors generally include an instruction address counter that indicates the address of the next instruction to be executed and is automatically incremented upon each instruction retrieval. The processor, in this example, should never attempt to execute a memory location outside of the boot sequence 1302 and the operating system 1303. Doing so indicates a malfunction or a cyber attack. An advantage of filling the unused memory with NOPs may be that if the processor ever arrives there due to a cyber attack, the instruction address counter would automatically cycle around to the boot sequence, thereby erasing the attack.

In addition, the processor should never attempt to execute an address in the key table 1301, since those addresses contain data, not instructions. To avoid treating the single-use keys 1301 as instructions, the processor may be configured to recognize addresses in the key table space and treat them as non-executable. Alternatively, the processor may be configured to read the key table contents as NOPs, in which case the instruction address counter would then cycle up to the first address in the boot sequence. In addition, the key table may include no keys that resemble a legal computer instruction.

Upon finishing the boot instructions, the processor automatically begins executing the operating system 1303 instructions, which follow above the boot sequence. In some embodiments, the last instructions in the boot sequence may be to send a message to the ECU indicating that the re-boot has finished. The first instructions in the operating system may be to wait for a message from the ECU. In other embodiments, the first instructions of the operating system may be to automatically begin doing something pre-configured, such as taking measurements periodically or entering a DRX sleep cycle.

Upon receiving and demodulating each downcast message, the end device operating system 1303 interprets the message as a command, which generally triggers a pre-configured routine associated with the command. The routine, generally stored somewhere in the operating system 1303, may be configured to cause the end device to perform a measurement or activate an actuator, or other action depending on the command. Some routines also include replying to the ECU, after receiving the message (such as an acknowledgement) and/or after completing the assigned task (such as a pre-configured "done" message, or by reporting the measurement value).

In some embodiments, the last instruction of each command routine may be to reset the instruction address counter to a particular instruction of the operating system 1303. The particular instruction may be to wait for the next ECU command. Alternatively, if the end device is instructed to begin doing something repetitively, such as periodically performing a measurement or activating a switch, or entering a DRX sleep cycle, for example, then the last instruction of the autonomous routines may be to set the instruction address counter to the first address of the periodic task, thereby causing the end device to continue repeating the routine until ordered to stop. Alternatively, and more commonly, the periodic task may be triggered by an internal timer in the processor, which causes an interrupt when the timer expires. In that case, the final instructions of the routine may include resetting the timer and returning to a wait state. When the interrupt occurs, it generally includes or indicates the address of the periodic routine that is to be executed at that time.

Figure 13B:
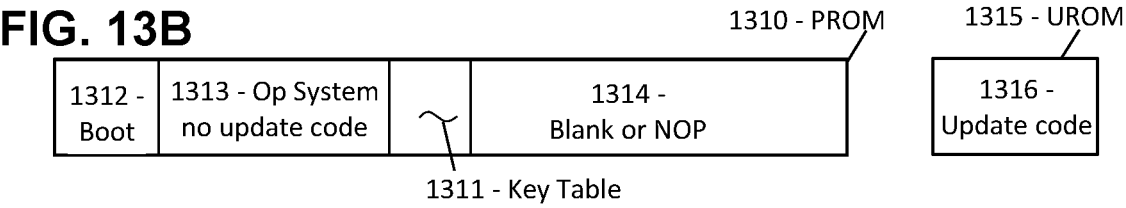

FIG. 13B depicts the secure memory of an end device as a PROM 1310 and an unalterable UROM 1315. The PROM 1310 contains the boot sequence 1312, the operating system 1313, and the key table 1311, in that order, followed by a final blank or NOP section 1314. The PROM does not include the installation routine, with instructions related to updating new firmware, in this example. Instead, the UROM 1315 contains the instructions 1316 for updating and installing new firmware. An advantage of placing the updating instructions 1316 in a separate memory 1315 may be that the processor can execute the updating instructions 1316 from the UROM 1315 while the main PROM 1310 is erased or partially over-written. For some types of ROM, it is difficult to install new instructions into a memory while executing instructions from that memory. Another advantage may be that a hacker cannot alter the installation instructions 1316 since they are secured separately, thereby preventing intrusion during updating processes.

Figure 13C:
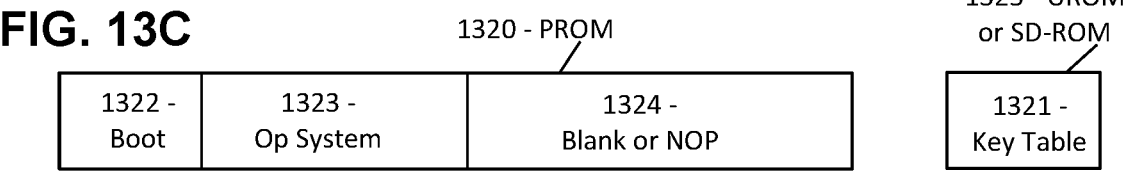

FIG. 13C depicts secure memories of an end device, including a PROM 1320 and a UROM or SD-ROM 1325. In this case the PROM 1320 includes a boot sequence 1322 starting at address 0000, followed by the operating system 1323, then the unused section 1324. In this case, the operating system 1323 includes the updating instructions. The UROM or SD-ROM 1325 holds the single-use key table 1321.

As mentioned, an SD-ROM, or self-destruct read-only memory, erases each entry after it has been read once, thereby preventing re-use. For example, if a hacker somehow gains entry into an end device and reads a key in the key table, the hacker could in principle send a fake installation message directing the end device to install malware using the pilfered key. However, if the memory is an SD-ROM, the attack would fail because the end device would then read zero when the end device attempts to access the indicated key, since it was automatically erased as soon as the hacker reads it. (The SD-ROM is analogous to a quantum wave function that is instantly changed when it is measured. But the physics is different.)

An advantage of placing the key table 1321 in unalterable or self-destruct memory 1325 may be that the single-use keys 1321 may remain safe from accidental alteration, or deliberate sabotage by a hacker. An advantage of placing the boot sequence 1322 at the bottom of the PROM 1320 may be that a re-boot can then be started simply by clearing the instruction address counter (that is, setting it to zero), without having to keep track of non-executable addresses and the like. If the key table is in another memory unit, all of the PROM memory addresses are executable, even though the higher section 1324 contains only null instructions. Another advantage may be that if the processor somehow gets into the blank section 1324, it will automatically advance to the end without doing anything, roll over to address zero, and continue executing the boot sequence 1322. Thus any glitch causing an incursion into the blank area 1324 inevitably triggers an automatic re-boot.

Figure 13D:
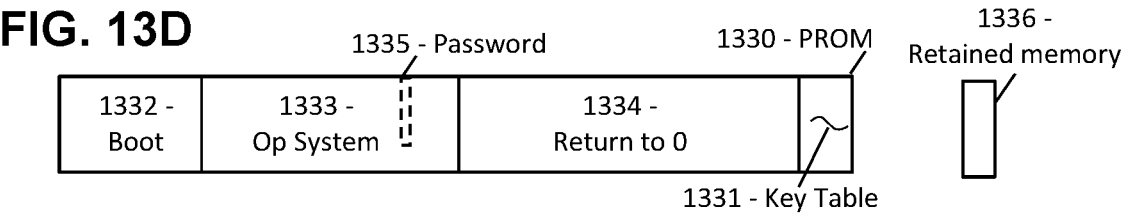

FIG. 13D depicts a PROM 1330 of an end device containing the boot sequence 1332 starting at the bottom address 0000, followed by the operating system 1333, then a blank section 1334 which is filled with instructions to clear the instruction address counter. Thus each instruction of the blank section 1334 sends the processor back to the first instruction of the boot sequence 1332, as desired. The last section is the single-use key table 1331, which is protected from incursion by the reset commands of the blank section 1334. A password 1335 (in dash), hidden in the operating system 1333, is data that can be used to activate the write-enable feature of the PROM 1330. The password is located between two of the pre-configured routines, and thus is skipped over when the routines are executed. This avoids the password being treated as an executable address. The end device may already know, according to instructions in the operating system, how the password 1335 is distributed or formatted, but not the actual location, while the location may be indicated in the installation message, encrypted along with the firmware. Protecting the password 1335 in this way may provide an additional layer of security.

Also shown is a "retained" memory 1336, which is a small RAM region containing running conditions (ID lengths, operating frequencies, and the like) which is not erased upon each re-boot, when all the other RAM addresses are erased. It may be convenient for the end device to save the running conditions instead of erasing them on each re-boot. Alternatively, some of the processor registers may be used as the retained memory 1336. Alternatively, the retained memory may be a separate small RAM or PROM, sized to contain only the running conditions. Alternatively, the retained memory may be a predetermined portion of a larger operating RAM in the end device. Saving the running conditions in this way may enable the end device to resume operations after each re-boot, without waiting for the ECU to transmit the current running conditions. However, if a cyber attack is suspected, the end device may erase the retained memory 1336, or the ECU may command the end device to do so, and may then refresh the running conditions in a subsequent downcast transmission.

Figure 13E:
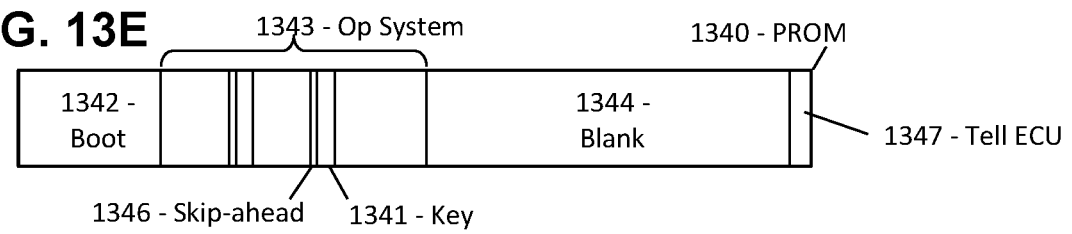

FIG. 13E depicts a PROM 1340 of an end device including first a boot sequence 1342, then an operating system section 1343, followed by a blank section 1344. The operating system section 1343 includes the single-use keys 1341 inserted at multiple places. Each single-use key 1341 is preceded by a "jump-ahead" instruction 1346 which instructs the processor to jump over the single-use key and continue executing thereafter. The locations of the single-use keys 1341 may be marked as non-executable locations, to ensure that the processor does not inadvertently try to execute them. Only two such portions are depicted for clarity, but the intent is to store all of the single-use keys interleaved with the operating system instructions. Embedding the single-use key table among the operating system instructions may enable an unlimited number of updates, since each new firmware version can provide multiple fresh single-use keys.

In this example, the top of memory includes a special set of instructions 1347 labeled "Tell ECU". If the instruction address counter somehow stumbles into the blank area 1344, it would then step through all the NOP instructions until reaching the Tell ECU section 1347, which causes the end device to transmit an alarm message to the ECU, informing the ECU that the end device has reached the blank area 1344, and therefore something is amiss.

Figure 13F:
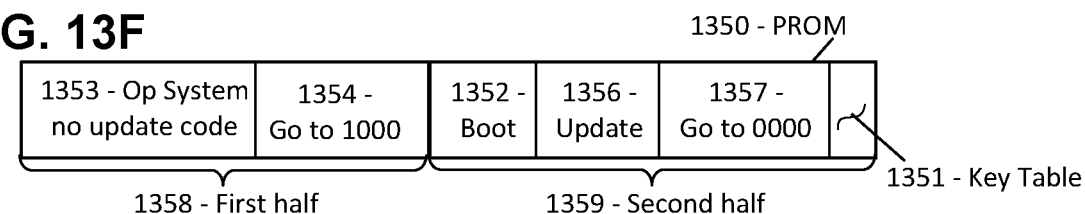

FIG. 13F depicts a PROM 1350 of an end device, divided into two halves, a first half 1358 and a second half 1359. For example, addresses in the first half 1358 may start with 0 and in the second half 1351 may start with a 1. The first half 1358 includes the operating system 1353, but with no updating and installation instructions. This is followed by a blank section filled with instructions to go to the first address of the second half 1359, which in this case would be hex-1000. The second half 1359 includes the boot sequence 1352, followed by an updating and installation routine 1356, followed by a second blank section 1357 filled with instructions to clear the instruction address counter, or equivalently, go to 0000 which is the first instruction of the operating system 1353. (Alternatively, the second blank section 1357 may be filled with instructions to go to hex-1000, forcing a re-boot after the new installation.) Finally the key table 1351 is at the top of the second half 1359. The last instruction of the boot sequence 1352 in this case is to clear the processor instruction address counter to 0000, which automatically starts the operating system 1353 after each re-boot, and also protects the updating section 1356 from unintentional intrusion.

An intent of the first blank section 1354, filled with instructions to go to 1000, may be to force an immediate re-boot if the processor ever tries to execute an instruction in the first blank area 1354. An intent of the second blank area 1357 filled with instructions to go to 0000 may be to begin running the operating system 1353 automatically as soon as the updating instructions 1356 are finished. Another intent may be to protect the single-use key table 1351 from unintentional access. Only the updating instructions 1356 can access the range of addresses corresponding to the key table 1351.

As a further security feature, the processor may be configured to interpret all addresses that start with a 1, that is, all addresses in the second half 1359, as non-executable during normal operations. Only booting and updating procedures can access the second half 1359. The update installation message may provide the ability to access the second half 1359 for updating. For example, upon receiving an installation message from the ECU, the processor may enable access to the second-half 1359 and begin executing at the first instruction of the update section 1356. The update section 1356 can then retrieve just one of the single-use keys 1351 according to an index provided by the installation message. In this way, the second half 1359 is protected from access except for re-booting and updating.

Figure 13G:
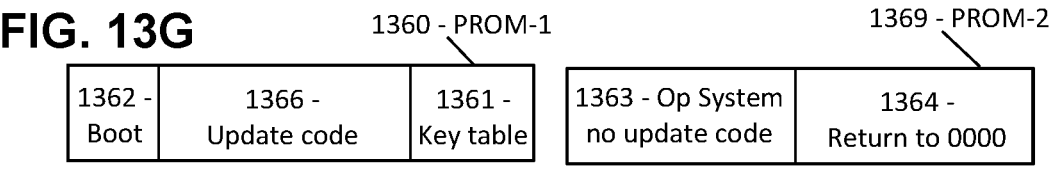

FIG. 13G depicts two PROM memories in an end device. A PROM-1 1360 includes a boot sequence 1362 starting at the first address, followed by an update installation code 1366, and finally a single-use key table 1361. Blank regions are not shown, but may be added to separate those three regions. Those blank regions may be filled with commands to re-boot, since they should never be executed. The blank regions may also include informing the ECU of the problem. Alternatively, the first instruction of the boot sequence may be to inform the ECU that the end device is re-booting. PROM-2 1369 includes an operating system 1363 with no updating or installation instructions, followed by a blank region 1364 filled with instructions to return to address zero, which is the start of the boot sequence 1362. An advantage of using two PROM memories may be that one of them (PROM-2 1369) can be updated with a new operating system, while the other one (PROM-1 1360) manages the updating process. Another advantage may be that PROM-1 1360 contains routines and data that are unlikely to change, whereas the operating system 1363 is likely to change whenever the tasks of the sub-network change.

In some embodiments, PROM-1 can also be changed, using instructions that may be present in PROM-2 1369 for example. In that case, the key table 1361 may be refreshed by a PROM-1 update, enabling an unlimited number of single-use keys. Allowing PROM-1 to be updated also enables installation of an improved update routine. If PROM-1 is the type of memory in which individual addresses can be re-written, then each single-use key may be deleted when it is used, or optionally replaced by a new key. To prevent a hacker from altering PROM-1, the unit may be configured to require a physical enablement, such as a button press by a repairman, before altering.

The memory configurations of FIGS. 13A-G are not exhaustive options for secure memory configurations in the end devices. Further embodiments, not shown here, include storing the key table and/or the update code in a small secure memory within the processor, which may be considered as a separate ROM in some embodiments. Artisans may devise other memory configurations after reading this disclosure, without departing from the present principles.

Figure 14:
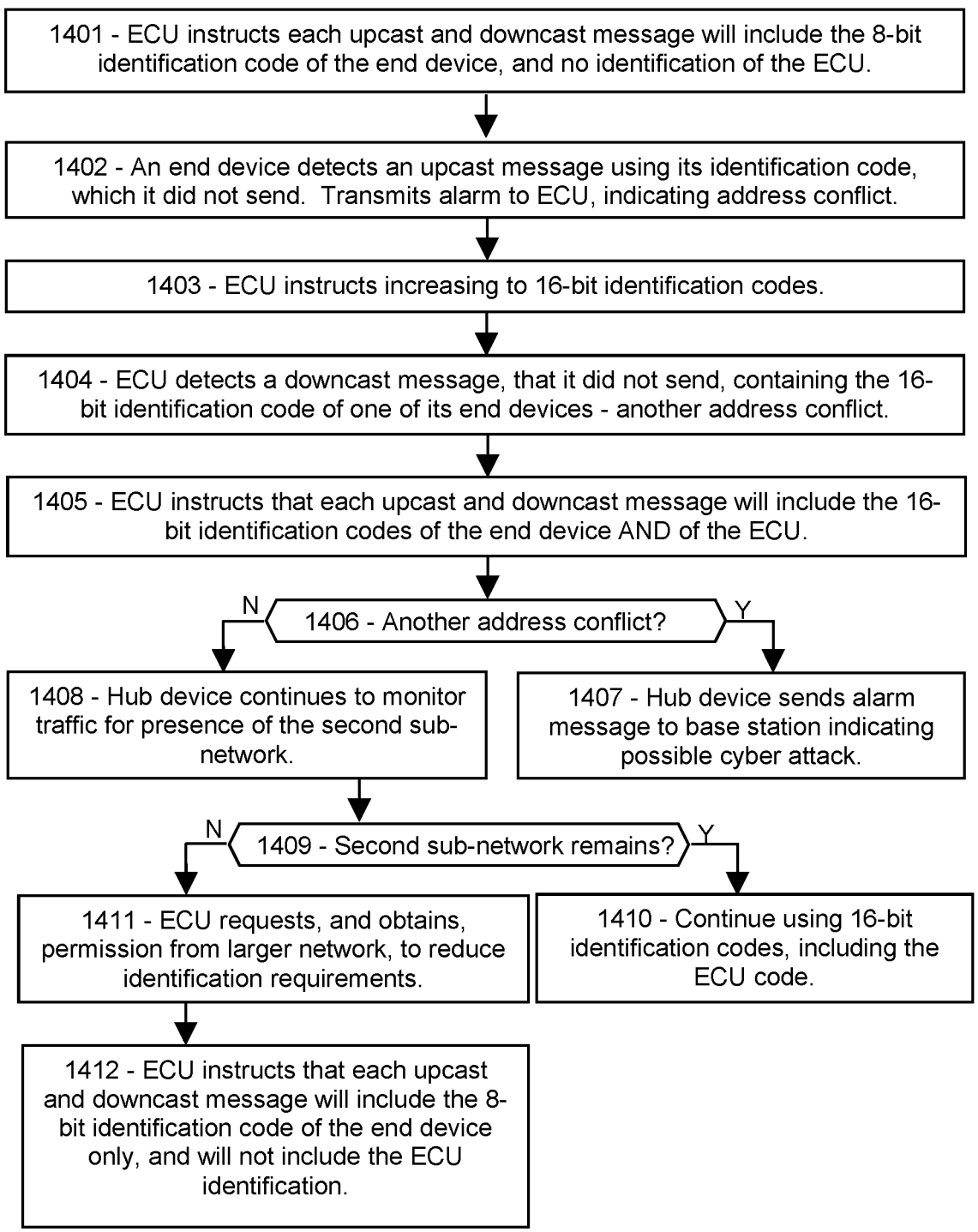
FIG. 14 is a flowchart showing an exemplary embodiment of a procedure for selecting identification codes, according to some embodiments.

FIG. 14 is a flowchart showing an exemplary embodiment of a procedure for selecting identification codes, according to some embodiments. The flowchart items may be executed in any order. As depicted in this non-limiting example, a sub-network increases its identification code requirements in response to address conflicts with another sub-network which happens to be using the same local identification codes.

At 1401, the ECU of a first sub-network instructs its end devices to use their short 8-bit local identification codes in each upcast message, and to expect each downcast message to also include the recipient end device's 8-bit identification code.

At 1402, one of the end devices detects an upcast message, which it did not send, and which includes that end device's 8-bit identification code. This is an address conflict, indicating that a second sub-network has come within radio range and is using the same identification code for at least one of its end devices. The end device transmits an alarm to the ECU indicating the problem, and automatically includes the ECU identification code so the intruding sub-network will know it is not for them.

At 1403, the ECU instructs its end devices to begin using their 16-bit identification codes, to avoid further address conflicts. However, the second sub-network is still within radio range, and therefore the end devices of the other sub-network may have received the instruction to begin using 16-bit identification. They would not know that the message was not intended for them because the 8-bit addresses are still in use, at that time. Therefore, thinking that the instruction was intended for them, the second sub-network end devices may also switch to their 16-bit codes. The ECU of the second sub-network probably also received the instruction message from the first ECU, but the second ECU would be able to tell that it came from the ECU of the first sub-network, since it is a downcast message that the second ECU did not send. In this case, however, the second ECU decided that upswitching the identification codes is a good idea, and therefore began using its 16-bit codes as well.

In another embodiment, each ECU may be configured to automatically include, in each broadcast message, the identification code of the transmitting ECU by default. In that case, there would be no confusion regarding which sub-network had changed to the 16-bit codes. After detecting the broadcast from the first ECU, instructing the first ECU's end devices to switch to the 16-bit ID codes, the second ECU may do the same and instruct its end devices to switch to the 16-bit codes too. In other cases, the second ECU may decide to keep using the 8-bit identification codes. Such decisions (whether to increase the ID requirements) may depend on a pre-configured priority assigned to each sub-network, such that higher-priority sub-networks, or those with tighter latency requirements, may decide to continue using the short 8-bit ID codes while another sub-network, with lower priority, may need to switch to the 16-bit codes to avoid address contention. In other cases, the larger network may require lower-priority sub-networks to use the longer ID codes whenever an address conflict is likely.

At 1404, at a later time, the ECU of the first sub-network detects a downcast message, which it did not send, including the 16-bit address of one of its end devices. This is another address conflict. At 1405, therefore, the ECU of the first sub-network instructs its end devices to add the 16-bit identification code of the ECU to all of their upcast and downcast messages, in addition to the 16-bit identification code of the end device. As mentioned, the ECU may sign broadcast messages with its own 16-bit (or 128-bit) ID so that the end devices of both sub-networks will know which ECU it is.

At 1406, the ECU and the end devices watch for any more address conflicts. They don't expect any, because the 16-bit identification codes for the end devices and the 16-bit (or 128-bit) identification codes for the ECU, in each message, represents a high threshold for coincidental conflict.

At 1407, however, another address conflict is detected. This raises the suspicion that a hacker is afoot, so the ECU sends a message to the base station alerting that a hacker may be attempting to spoof the end devices or the ECU. After that, depending on implementation, the ECU may instruct its end devices to re-boot or take other security measures. The ECU may change its own ID to a different random value, and inform its end devices of the change. The ECU may instruct that the longer 32-bit codes be used instead of the 16-bit codes. The larger network may require further steps to isolate the cyber attack, or diagnose the problem further.

At 1408, on the other hand, there are no further address conflicts. The ECU continues to look for messages signed by the ECU of the second sub-network, for some period of time. At 1409, the ECU determines whether the second sub-network is still within radio range. If so, at 1410, the ECU takes no action, thereby causing its end devices to continue using the 16-bit identification codes and the ECU code.

At 1411, the ECU has found that the second sub-network is no longer within radio range, based on a lack of messages signed by the ECU of the second sub-network for some period of time. In some embodiments, the ECU may instruct its end devices to switch back to the 8-bit ID codes without further delay. In other embodiments, the ECU may be required to obtain permission from the larger network before making the switch. The larger network may manage the ID requirements of the sub-networks, because the larger network likely knows whether another vehicle is within radio range. In the depicted case, the larger network agrees that the sub-network can reduce its ID requirements. Finally at 1412, the ECU instructs its end devices to revert to the original 8-bit identification codes, and to omit the ECU code, in all upcast and downcast messages.

In some embodiments, when address conflicts occur, the vehicle 3GPP network may direct that a first sub-network can use the shorter codes while a competing second sub-network must use the longer codes. This decision may be based, for example, on the 3GPP network placing higher priority on the first sub-network's activities.

In some embodiments, the 3GPP network may allocate different, non-overlapping time intervals for each conflicting sub-network to communicate, the other remaining silent, thereby eliminating address conflicts even when the two sub-networks have the same local identification codes.

In some embodiments, the competing ECUs may agree on a particular signal that differentiates the messages in the two sub-networks. For example, one sub-network may begin all messages with a first demodulation reference while the second sub-network may use a different demodulation reference. For example, the first sub-network may precede messages with a short-form demodulation reference consisting of a 90-degree phase signal followed by a 270-degree phase signal, whereas the second sub-network may use a 270-degree signal followed by a 90-degree signal, or equivalent. Alternatively, one sub-network may precede messages with a single pulse signal followed by a gap of no transmission, while the other may use two pulses followed by a gap.

In some embodiments, the ECUs may change their identification codes, or the identification codes of their end devices, to disambiguate the messages. For example, the ECUs may communicate through the 3GPP network to agree on the new ECU identification codes, and then may inform their end devices of the change. The 3GPP network may manage such conflicts and resolutions for benefit of the human driver/pilot or to enhance safety, for example. The 3GPP network may direct the ECUs, that are known to be proximate to each other, to use communication methods and ID versions to avoid future address conflicts, and these methods may be different for each sub-network.

In some embodiments, an AI model may be configured to manage the sub-networks including identification protocols and formats. The AI model may take as input the responsibilities and capabilities of each sub-network in the vehicle, and current traffic conditions, among other inputs, and may provide as output a series of instructions to the ECUs, instructing them as to tasks, protocols, identification types, and the like.

Figure 15:
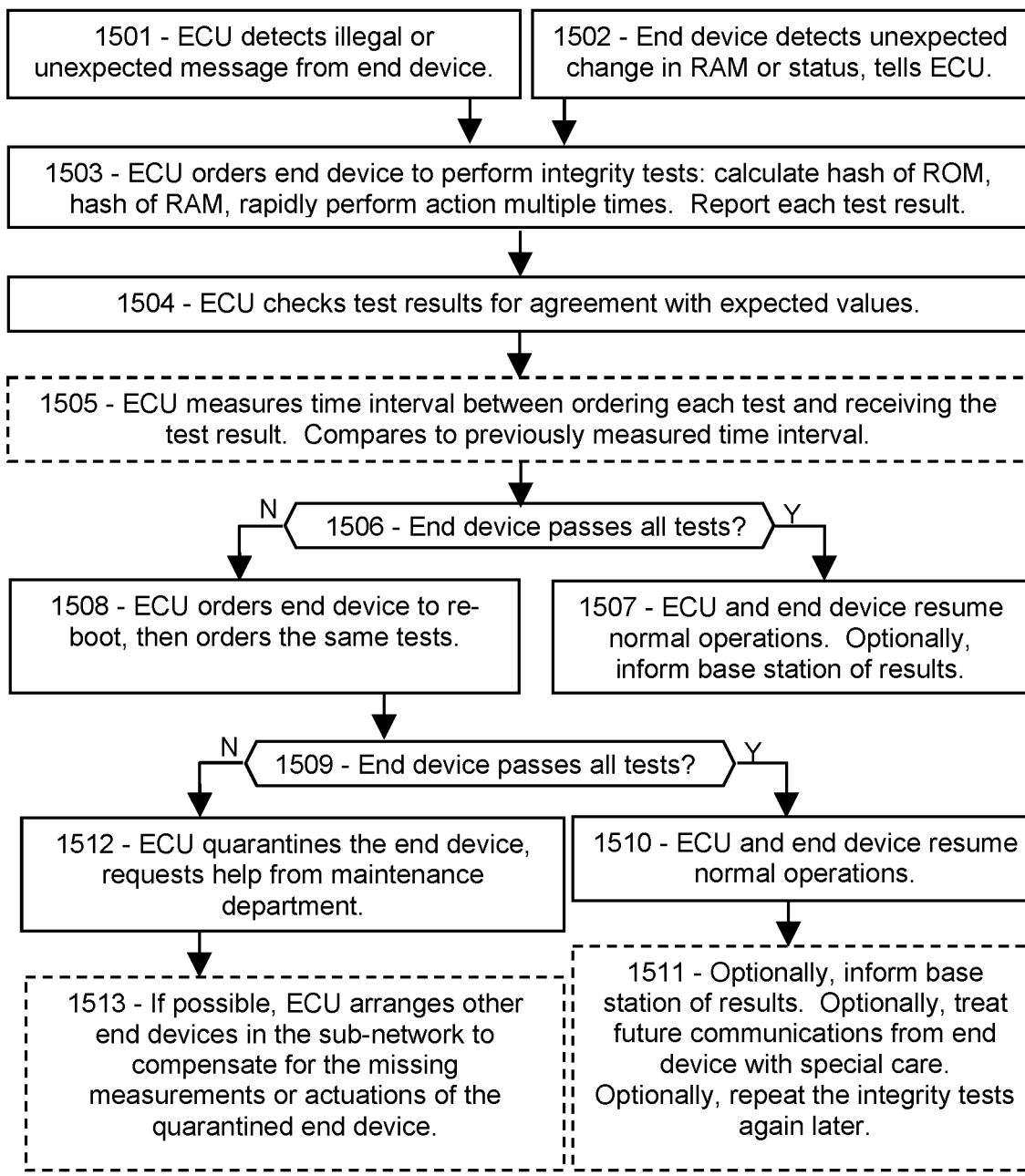
FIG. 15 is a flowchart showing an exemplary embodiment of a procedure for responding to a possible hacker attack, according to some embodiments.

FIG. 15 is a flowchart showing an exemplary embodiment of a procedure for responding to a possible hacker attack, according to some embodiments. The flowchart items may be executed in any order. As depicted in this non-limiting example, a problem in a sub-network triggers defensive actions by the ECU and end devices.

At 1501, the ECU detects a possible attack signature, such as an illegal format of an upcast message, or an unsolicited reply from an end device, for example. Alternatively, at 1502, the attack may be detected by the end device, based on an unexpected change in its RAM or registers, or an actuator that was mysteriously switched, for example. The end device then transmits a message, preferably a pre-configured alarm message, to the ECU indicating the suspected attack.

At 1503, responsive to either the ECU or end device detecting the problem, the ECU can then order one or multiple integrity tests that the end device can perform. For example, the end device can calculate an error-detection code of the ROM, which should never change outside of an official update procedure. The ECU could also order a hash of the RAM and registers, to determine where the problem exists. The ECU could order the end device to perform a sensor measurement or actuation repeatedly, some number of times in rapid succession, to identify any changes in performance. The end device transmits the result of each test to the ECU, which at 1504 compares the result to a predetermined value, thereby determining whether the system has changed. In addition, at 1505, the ECU may measure how long the end device takes to perform each test before reporting, and may thereby acquire further data about the possible attack.

At 1506 the ECU checks the integrity test results, and at 1507 finds that all of the integrity tests are passed satisfactorily, so the ECU and end devices may then resume normal operations, and the ECU may inform the base station of the incident. Alternatively, at 1508, the results of one or more integrity test have changed, indicating a real problem. In response, the ECU orders the end device to run the boot sequence, and then orders the same tests, including especially those that were failed before.

At 1509, if the results of the second round of integrity tests are in agreement with the predetermined values, then at 1510 the ECU and end device may resume normal operations, although at 1511 the ECU may treat upcast messages from the end device with special care thereafter. Alternatively, at 1512, the ECU finds that the integrity tests are not in agreement with the predetermined values, and therefore quarantines the bad end device while contacting the base station. At 1513, the ECU reconfigures the other end devices in its sub-network (or enlists other sub-networks) to cooperate in filling in the tasks that the now-silent end device was to perform.

CONCLUSIONS

Sub-networks within a vehicle-wide managed network, configured according to present principles, may enable secure wireless connectivity for billions of connected vehicles worldwide. Basic sensor/actuator end devices are managed by a gateway ECU, belonging to the vehicle-wide 3GPP network as a user device, are thereby protected from attack while providing firewall service to protect the ECU and the larger network. Protocols and memory configurations, and other aspects disclosed herein, may thereby support the development of next-generation vehicles with lower-cost manufacturing and enhanced mobile connectivity, while maintaining the level of cybersecurity expected of next-generation vehicles.

It may be hoped that 3GPP will include vehicle security protocols in future standards, thereby providing the uniformity and universality that are so urgently needed in this valuable, expanding world of connected software-defined vehicles.

The systems and methods disclosed herein may be configured in an aircraft, to provide needed cybersecurity of software and control systems of the aircraft, thereby preventing hacking intrusions with catastrophic results. The cybersecurity principles disclosed herein may be applicable to both manual updating (using a jump drive, for example) and remote updating (using wireless signals, for example).

In addition, the aircraft may include a processor and systems for automatic collision prevention, by analyzing sensor data (and/or other data from any source, such as a control tower or an air traffic control center) to determine relative positions of other vehicles or objects that the aircraft may encounter, and to determine when a collision becomes possible and/or imminent. The processor may also calculate the effect of various actions, such as braking and steering, to determine which sequence of actions can avoid the collision. The processor may also autonomously activate linkages connected to the various aircraft controls such as ailerons, elevators, rudder while flying, or the wheel brakes and wheel steering while taxying. In an emergency, the processor may activate the controls autonomously, according to the selected sequence, to avoid the collision. However, the pilot may counteract such autonomous actions using the manual controls.

The wireless embodiments of this disclosure may be aptly suited for cloud backup protection, according to some embodiments. Furthermore, the cloud backup can be provided cybersecurity, such as blockchain, to lock or protect data, thereby preventing malevolent actors from making changes. The cybersecurity may thereby avoid changes that, in some applications, could result in hazards including lethal hazards, such as in applications related to traffic safety, electric grid management, law enforcement, or national security. Artificial intelligence models and/or machine learning may be used to adjust parameters of the systems and methods disclosed herein, for example by finding correlations among those parameters that may be impossible for a human to comprehend due to their complexity, but which may enable substantial improvements in performance of the systems and methods.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A vehicle comprising:
a) an internal wireless network contained in the vehicle, the internal wireless network comprising an internal base station and an internal core network;
b) a plurality of electronic control units ("ECUs"), each ECU registered as a user device on the internal wireless network and configured to communicate wirelessly with the internal base station on managed communication channels; and
c) for each ECU, two or more end devices associated with the ECU, each end device comprising a sensor or an actuator, the sensor or actuator operably connected to a processor comprising a programmable read-only memory ("PROM"), the processor operably connected to a wireless transceiver configured for wireless communication with the ECU;
d) wherein the internal base station or internal core network comprises a transceiver configured to communicate, using a Doppler-corrected wireless link, with an external base station or external core network at a fixed site external to the vehicle; and
e) wherein each communication between an end device and the associated ECU comprises exactly one of:
   i) a command transmitted from the ECU to the end device; or
   ii) a message comprising data or a pre-configured reply, transmitted from the end device to the ECU.

2. The vehicle of claim 1, wherein the managed communication channels between each ECU and the internal base station are configured according to 5G or 6G technologies.

3. The vehicle of claim 1, comprising at least one of:
a) a roadway vehicle comprising an automobile, a truck, or a bus;
b) a railroad vehicle comprising a passenger train or a freight train;
c) a waterborne vehicle comprising a boat or ship or submarine;
d) an airborne vehicle comprising a passenger airliner, a freight aircraft, a private plane, a helicopter, or an air taxi.

4. The vehicle of claim 1, wherein:
a) each end device is configured to accept messages from the associated ECU, and to reject or ignore all messages received from all other sources; and
b) each ECU is configured to accept messages received from an end device associated with the ECU, and to accept messages received from the base station, and to reject or ignore all messages received from all other sources, other than the associated end devices and the base station.

5. The vehicle of claim 1, wherein for each end device:
a) the PROM contains instructions comprising a boot sequence and an operating system;
b) the processor is configured to execute instructions of the boot sequence and the operating system; and c) the processor is further configured to avoid executing instructions from all other sources, other than the boot sequence and the operating system contained in the PROM.

6. The vehicle of claim 1, wherein for each end device:
a) the PROM contains a single-use key table comprising one or more single-use keys;
b) the end device is configured to receive an installation message from the ECU associated with the end device, the installation message comprising an index and encrypted firmware;
c) the processor is configured to retrieve a particular single-use key from the single-use key table, selected according to the index; and
d) the processor of the end device is further configured to use the particular single-use key to decrypt the encrypted firmware, and to install the decrypted firmware in the PROM.

7. The vehicle of claim 6, wherein for each end device:
a) the PROM includes a write-enable function that enables alteration of one or more instructions in the PROM;
b) the write-enable feature is protected by a password; and
c) the installation message comprises information enabling the processor to determine the password.

8. A vehicle comprising:
a) an internal wireless network contained in the vehicle, the internal wireless network comprising an internal base station and an internal core network;
b) a plurality of electronic control units ("ECUs"), each ECU registered as a user device on the internal wireless network and configured to communicate wirelessly with the internal base station on managed communication channels; and
c) for each ECU, two or more end devices associated with the ECU, each end device comprising a sensor or an actuator, the sensor or actuator operably connected to a processor comprising a programmable read-only memory ("PROM"), the processor operably connected to a wireless transceiver configured for wireless communication with the ECU;
d) wherein the internal base station or internal core network comprises a transceiver configured to communicate, using a Doppler-corrected wireless link, with an external base station or external core network at a fixed site external to the vehicle:
e) wherein each end device is configured to accept messages from the associated ECU, and to reject or ignore all messages received from all other sources; and
f) wherein each ECU is configured to accept messages received from an end device associated with the ECU, and to accept messages received from the base station, and to reject or ignore all messages received from all other sources, other than the associated end devices and the base station.

9. A vehicle comprising:
a) an internal wireless network contained in the vehicle, the internal wireless network comprising an internal base station and an internal core network;
b) a plurality of electronic control units ("ECUs"), each ECU registered as a user device on the internal wireless network and configured to communicate wirelessly with the internal base station on managed communication channels; and
c) for each ECU, two or more end devices associated with the ECU, each end device comprising a sensor or an actuator, the sensor or actuator operably connected to a processor comprising a programmable read-only memory ("PROM"), the processor operably connected to a wireless transceiver configured for wireless communication with the ECU;
d) wherein the internal base station or internal core network comprises a transceiver configured to communicate, using a Doppler-corrected wireless link, with an external base station or external core network at a fixed site external to the vehicle;
e) wherein for each end device:
  i. the PROM contains instructions comprising a boot sequence and an operating system;
  ii. the processor is configured to execute instructions of the boot sequence and the operating system; and
  iii. the processor is further configured to avoid executing instructions from all other sources, other than the boot sequence and the operating system contained in the PROM.

* * * * *